United States Patent [19]

Yamamoto et al.

[11] Patent Number: 5,243,947
[45] Date of Patent: Sep. 14, 1993

[54] FUEL INJECTION CONTROL SYSTEM FOR INTERNAL COMBUSTION ENGINES

[75] Inventors: Yoshio Yamamoto; Toshio Yokoyama; Susumu Toki; Hidehito Ikebe, all of Wako, Japan

[73] Assignee: Honda Giken Kogyo Kabushiki Kaisha, Tokyo, Japan

[21] Appl. No.: 911,292

[22] Filed: Jul. 9, 1992

[30] Foreign Application Priority Data

Aug. 14, 1991 [JP] Japan .................. 3-228800

[51] Int. Cl.⁵ ............................. F02M 37/04
[52] U.S. Cl. .......................... 123/458; 123/501
[58] Field of Search .......... 123/457, 458, 460, 357, 123/358, 359, 501

[56] References Cited

U.S. PATENT DOCUMENTS

| | | | |
|---|---|---|---|
| 4,457,281 | 7/1984 | Ueyama et al. | 123/460 |
| 4,480,619 | 11/1984 | Igashira et al. | 123/460 |
| 4,510,908 | 4/1985 | Eisele et al. | 123/458 |
| 4,624,233 | 11/1986 | Phillips | 123/458 |
| 4,733,640 | 3/1988 | Laufer et al. | 123/479 |
| 4,757,795 | 7/1988 | Kelly | 123/458 |
| 4,777,921 | 10/1988 | Miyaki et al. | 123/458 |
| 4,841,936 | 6/1989 | Takahashi | 123/501 |
| 5,024,200 | 6/1991 | Free et al. | 123/501 |
| 5,040,511 | 8/1991 | Eckert | 123/501 |
| 5,058,553 | 10/1991 | Kondo et al. | 123/458 |
| 5,094,216 | 3/1992 | Miyaki et al. | 123/456 |

FOREIGN PATENT DOCUMENTS 62-228642 10/1987 Japan.
2-291447 12/1990 Japan.

Primary Examiner—E. Rollins Cross
Assistant Examiner—Thomas Moulis
Attorney, Agent, or Firm—Lyon & Lyon

[57] ABSTRACT

A fuel injection control system is provided for use in a cylinder injection/spark ignition type internal combustion engine in which fuel is injected directly into cylinders through respective fuel injection valves mounted in the cylinder heads. An ECU determines a desired fuel injection amount based upon the engine rotational speed and an engine load condition, determines desired fuel pressure to be supplied to the fuel injection valves and controls the actual fuel supply pressure relative to the desired fuel pressure. The ECU causes fuel to be supplied under the desired fuel pressure to each of the fuel injection valves, based upon the engine rotational speed and injected thereby into the corresponding cylinder when the crank angle of the engine falls within a predetermined range in the vicinity of a top dead point of the cylinder corresponding to a compression stroke thereof. The predetermined crank angle range is set to a range of 20° BTDC to 5° ATDC.

9 Claims, 18 Drawing Sheets

FUEL INJECTION CONTROL SYSTEM FOR INTERNAL COMBUSTION ENGINES

BACKGROUND OF THE INVENTION

1. Field of the Invention

This invention relates to a fuel injection control system for internal combustion engines, and more particularly to a fuel injection control system for so-called cylinder injection type (spark ignition type) internal combustion engines in which fuel such as gasoline is directly injected into cylinders through fuel injection valves mounted in heads of the respective cylinders.

2. Prior Art

Conventionally, cylinder injection type internal combustion engines have been developed mainly for use as diesel engines. However, in recent years internal combustion engines of this type have also been intensively studied and developed for use as gasoline engines, as disclosed, e.g. by Japanese Provisional Patent Publications (Kokai) Nos. 62-228642 and 2-291447.

Such cylinder injection type internal combustion engines using gasoline generally employ fuel injection valves and spark plugs both mounted in heads of cylinders of the engine and in which fuel is directly injected into the cylinders through the fuel injection valves and ignited through spark discharge by the spark plugs. Such cylinder injection type engines are free from the fear that fuel is attached to inner walls of the intake pipe, and therefore are advantageous over conventional manifold injection type internal combustion engines in that just a required amount of fuel can be positively supplied into the cylinders, thereby being superior to the latter in respect to fuel consumption, etc.

In cylinder injection type engines, the pressure of fuel supplied to the fuel injection valves (fuel supply pressure) has to be higher than pressure within the cylinders to ensure positive injection of fuel into the cylinders, and therefore also the fuel supply pressure has to be controlled, unlike manifold injection type engines in which fuel is injected into the intake manifold under negative pressure. Specifically, in manifold injection type engines, fuel is supplied into the cylinders through the intake manifold which is placed under negative pressure when each intake valve is open, so that the pressure difference between the fuel supply pressure and absolute pressure within the intake manifold is maintained almost constant, whereby the fuel injection amount can be controlled only by varying the fuel injection period. In contrast, in cylinder injection type engines, fuel is supplied into the cylinders during the compression stroke when pressure within the cylinder assumes a value at least equal to or higher than atmospheric pressure and largely varies as the piston moves within the cylinder. Therefore, it is practically impossible to control the fuel injection amount only by varying the fuel injection period, thus requiring the fuel supply pressure to be controlled in order to determine the fuel injection amount.

However, the pressure within the cylinder (hereinafter referred to as "the cylinder pressure") largely varies with change in the piston position within the cylinder as mentioned above, and accordingly, the required fuel supply pressure also differs depending upon the piston position at which fuel is injected. Particularly, the difference in cylinder pressure between a bottom dead point (BDC) of the piston and a top dead point (TDC) of same is large, making it difficult to accurately control the fuel supply pressure to required values over the entire compression stroke.

Under the above-mentioned circumstances, in conventional cylinder injection type engines in general, when the piston is positioned in the vicinity of the BDC immediately after tje start of the compression stroke at which the cylinder pressure is relatively low (approximately 2-5 kg/cm$^2$), fuel is injected through the fuel injection valve for supply to the cylinder under a predetermined fuel supply pressure higher than the cylinder pressure, and then the spark plug is caused to effect spark discharge at a piston position close to the TDC when the injected fuel has been evenly dispersed throughout the cylinder space.

However, since conventionally spark ignition is effected in a state where the fuel is evenly dispersed throughout the cylinder space by injecting fuel into the cylinder at a piston position close to the BDC as mentioned above, the exhaust valve is opened when fuel at areas remote from the spark plug is not yet burned, and the unburnt fuel is emitted to the outside as a noxious component. That is, in the conventional engines, during low load operation of the engine hydrocarbons (HC) are emitted, whereas during high load operation of the engine smoke or high concentration NOx is emitted, resulting in degraded exhaust emission characteristics.

To cause firing of fuel, it suffices that a mixture having a predetermined degree of concentration of fuel (i.e., predetermined air-fuel ratio) is present around the spark plug. However, in the conventional cylinder injection type engines, spark ignition is effected in the state where fuel is evenly distributed throughout the cylinder space by injecting fuel at a piston position close to the BDC, i.e. immediately after the start of the compression stroke, which results in an excessive amount of fuel being supplied into the cylinder for firing the fuel, leading to a high rate of fuel consumption.

SUMMARY OF THE INVENTION

It is an object of the invention to provide a fuel injection control system for a cylinder injection/spark ignition type internal combustion engine, which contributes to improvements in exhaust emission characteristics of the engine as well as fuel consumption thereof.

It is a further object of the invention to provide a fuel injection control system for an internal combustion engine of this type, which is capable of accurately controlling fuel injection termination and hence the fuel injection amount to thereby improve the driveability of the engine.

To attain the above objects, the present invention provides a fuel injection control system for an internal combustion engine having at least one cylinder having a combustion chamber defined therein, at least one fuel injection valve arranged, respectively, in the at least one cylinder, fuel being injected directly into the combustion chamber of the at least one cylinder through the at least one fuel injection valve.

The fuel injection control system according to the invention comprises:

crank angle-detecting means for detecting a crank angle of the engine whenever the engine rotates through a predetermined crank angle;

rotational speed-detecting means for detecting the rotational speed of the engine;

operating condition-detecting means for detecting operating conditions of the engine including a load condition of the engine;

fuel injection amount-calculating means for calculating a desired fuel injection amount based upon the rotational speed of the engine detected by the rotational speed-detecting means and the load condition of the engine detected by the operating condition-detecting means;

fuel pressure-determining means for determining desired fuel pressure based upon the rotational speed of the engine detected by the rotational speed detecting means;

fuel pressure-control means for controlling pressure of fuel supplied to the at least one fuel injection valve to the desired fuel pressure determined by the fuel pressure-determining means; and fuel supply-control means for supplying fuel to the at least one fuel injection valve under the desired fuel pressure determined by the fuel pressure-determining means, the fuel supply-control means causing supply of the fuel into the at least one cylinder through the at least one fuel injection valve when the crank angle detected by the crank angle-detecting means falls within a predetermined range in the vicinity of a top dead point of the at least one cylinder, corresponding to the compression stroke thereof.

In a cylinder injection type internal combustion engine, to improve fuel consumption, it is desirable that fuel should be supplied into the cylinder at a piston position in the vicinity of its top dead point corresponding to the compression stroke at which spark ignition is effected. By thus supplying fuel into the cylinder at a piston position in the vicinity of its top dead point corresponding to the compression stroke, spark ignition can take place in a state where the mixture within the cylinder is stratified such that only a space surrounding the spark plug is filled with a mixture having a required air-fuel ratio. More specifically, at areas remote from the spark plug, there exists a relatively small amount of mixture i.e. a lean mixture, therefore the amount of unburnt fuel, which is emitted when the exhaust valve is opened immediately after the following explosion stroke is reduced, resulting in reduction in the emission of HC, smoke, NOx, etc. and hence improving the exhaust emission characteristics of the engine. Further, by virtue of the stratification of the mixture within the cylinder, the minimum possible amount of fuel is consumed for effecting spark ignition, thereby reducing fuel consumption.

On the other hand, in a cylinder injection type internal combustion engine using gasoline in which fuel is ignited through spark discharge of spark plugs, not as high a fuel supply pressure (pressure of fuel supplied to the fuel injection valve) is required as the fuel supply pressure (e.g. 1000 kg/cm$^2$) required by a diesel engine in which fuel ignition is effected only by heat generated by compression of air within the cylinder. However, as is known, a fuel supply pressure of approximately 70–120 kg/cm$^2$ is required depending upon operating conditions of the engine, to atomize the injected fuel into a particle size of approximately 10$\mu$ for good firing as well as to set the fuel supply pressure higher than the cylinder pressure.

Therefore, according to the invention, the fuel supply means supplies fuel into the cylinder under the desired fuel pressure determined by the fuel pressure-determining means, when the crank angle detected by the crank angle-detecting means falls within a predetermined range in the vicinity of the top dead point (TDC) corresponding to the compression stroke of the cylinder. As a result, fuel can be supplied into the cylinder under a desired fuel pressure depending upon operating conditions of the engine, and therefore, good firing of fuel can be achieved with the minimum possible amount of fuel, thus improving fuel consumption.

Further, as mentioned hereinbefore, the cylinder pressure largely varies as the piston moves within the cylinder, that is, the cylinder pressure does not remain constant. In addition, high fuel supply pressure is required, and the actual injection fuel pressure (=fuel supply pressure-cylinder pressure) is largely pulsated due to movement of the piston. Therefore, in conventional engines of this type, there is a possibility that injection of the desired fuel amount is not completed within one cycle of operation of the engine. In other words, conventional engines do not have satisfactory injection amount accuracy. To overcome this disadvantage, the fuel supply pressure may be controlled to vary during one cycle of operation of the engine. However, in actuality, it is difficult to maintain the actual injection fuel pressure at a constant value by varying the fuel supply pressure over one cycle of operation.

To solve this problem, according to the invention, cylinder pressure-detecting means are provided for each cylinder, which detects the cylinder pressure. Further, sequential decrement means are provided, which, when the crank angle of the engine falls within the aforesaid predetermined range, sequentially calculates an actual fuel injection amount based upon the difference between the fuel supply pressure and the cylinder pressure detected by the cylinder pressure-detecting means, and sequentially subtracts the calculated actual fuel injection amount from the desired fuel injection amount to thereby control the fuel injection end or timing of termination of the fuel injection. By virtue of these means, fuel injection termination is sequentially corrected in response to changes in the cylinder pressure, ensuring that fuel injection for each operating cycle can be completed exactly when the desired fuel injection amount has been injected, thereby improving the accuracy of fuel injection.

Preferably, the aforesaid predetermined crank angle range within which fuel injection is to be effected should be limited to a range from 20° before the top dead point (BTDC) to 5° after the top dead point (ATDC). By thus limiting the predetermined crank angle range, an optimal amount of fuel required for combustion can be supplied to the combustion chamber so that so-called stratified combustion takes place under all load conditions of the engine, resulting in improved exhaust emission characteristics.

Also preferably, the above sequential decrement of the fuel injection amount by the sequential decrement means is executed whenever a crank signal pulse generated by the crank angle-detecting means or a false signal generated at predetermined time intervals to correct fuel injection termination is generated. By setting the crank signal such that its pulse interval is as short as possible, or by setting the false signal such that its pulse interval is shorter than the pulse interval of the crank signal, the fuel injection termination can be sequentially corrected in an almost continuous manner, to thereby further accurately control the fuel injection amount and hence improve driveability.

Still further, according to the invention, there are provided a first processing circuit which is supplied with the crank angle signal or the false signal, and at least one second processing circuit which is provided, respectively, for the cylinders and executes the sequential decrement of the fuel injection amount by the sequential decrement means, the first and second processing circuits being electrically connected with each other, such that the second processing circuit can execute the sequential decrement for each cylinder in synchronism with pulses of the crank signal or pulses of the false signal supplied to the first processing circuit, to thereby achieve high-speed and highly efficient processing.

The above and other objects, features, and advantages of the invention will be more apparent from the following detailed description taken in conjunction with the accompanying drawings.

DETAILED DESCRIPTION

The invention will now be described in detail with reference to the drawings showing an embodiment thereof.

Figure 1:
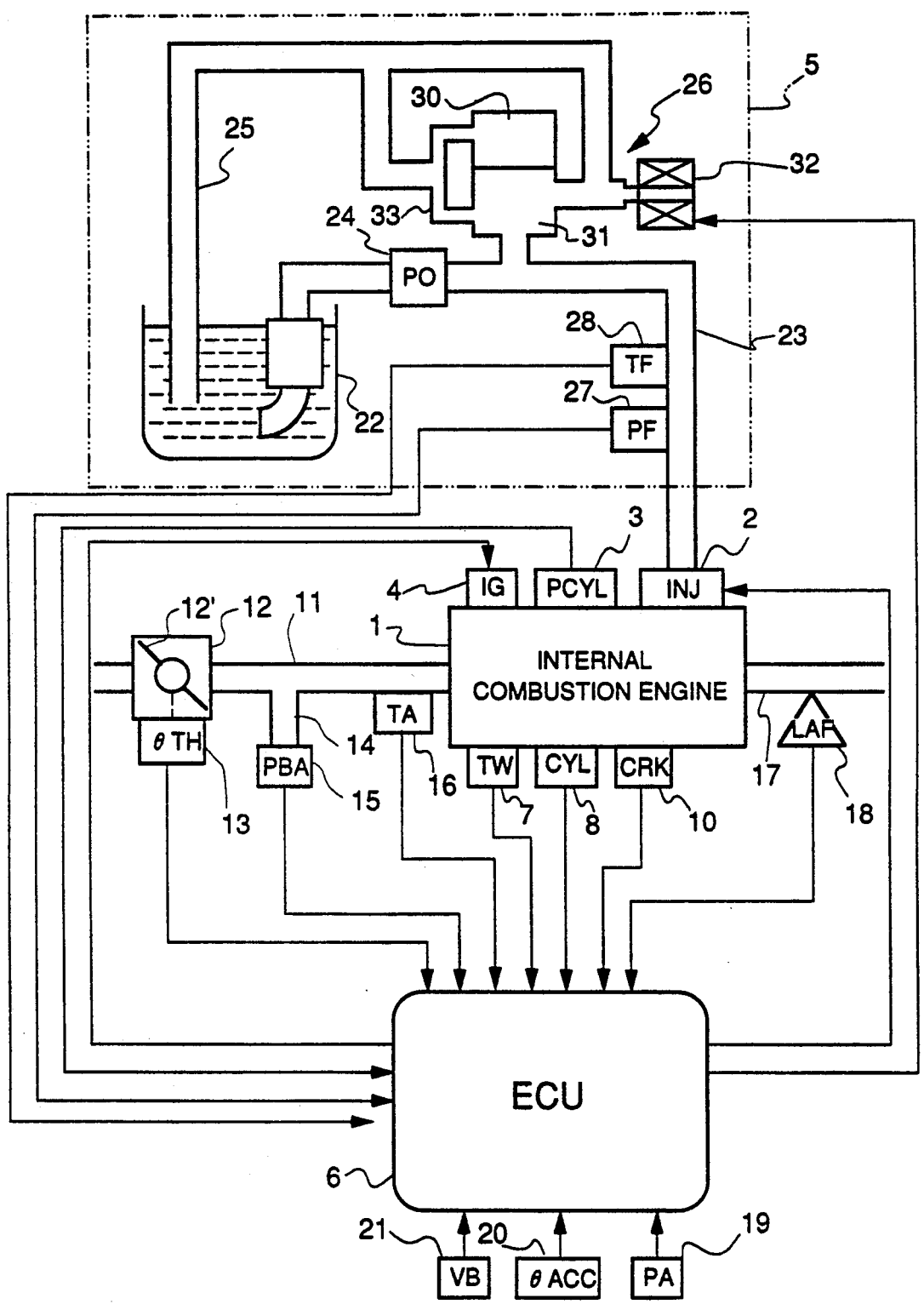
FIG. 1 is a block diagram of the whole arrangement of a fuel injection control system for an internal combustion engine according to an embodiment of the invention.

Referring first to FIG. 1, there is illustrated the whole arrangement of a fuel injection control system for an internal combustion engine, according to an embodiment of the invention.

In the figure, reference numeral 1 designates an internal combustion engine which is a cylinder injection/spark ignition type (hereinafter referred to merely as "the engine"). The engine 1 has a plurality of cylinders, not whown, each of which is provided with a fuel injection valve (INJ) 2, a cylinder pressure (PCYL) sensor 3, a spark plug (IG) 4, an intake valve, not shown, and an exhaust valve, not shown, all of which are arranged at respective predetermined locations within a cylinder head of the cylinder.

The fuel injection valves 2 are connected to a fuel supply system 5 and electrically connected to an electronic control unit (hereinafter referred to as "ECU") 6 to have their valve opening periods, etc. controlled by signals from the ECU 6.

The PCYL sensor 3 is electrically connected to the ECU 6 to supply an electric signal indicative of the sensed cylinder pressure PCYL to the ECU 6.

The spark plugs 4 are electrically connected to the ECU 6 to have their ignition timing controlled by signals from the ECU 6.

An engine coolant temperature (TW) sensor 7 formed of a thermistor or the like 7 is inserted into a wall of a cylinder filled with engine coolant within a cylinder block of the engine 1 to supply an electric signal indicative of the sensed engine coolant temperature TW to the ECU 6.

A cylinder-discriminating (CYL) sensor 8 and a crank angle (CRK) sensor 10 are arranged in facing relation to a camshaft or a crankshaft of the engine, neither of which is shown, at respective predetermined locations thereof. The CYL sensor 8 generates a pulse (hereinafter referred to as "the CYL-discriminating signal") at a predetermined crank angle of a particular cylinder whenever the crankshaft rotates through two revolutions, and supplies the CYL-discriminating signal to the ECU 6. The CRK sensor 10 generates a pulse (hereinafter referred to as "the CRK signal") whenever the crankshaft rotates through a predetermined very small crank angle (e.g. 1°), and supplies the CRK signal to the ECU 6.

Arranged across an intake pipe 11 extending from the cylinder block of the engine 1 is a throttle body 12 in which is mounted a throttle valve 12' to which is connected a throttle valve opening ($\theta$TH) sensor 13 which supplies an electric signal indicative of the sensed throttle valve opening $\theta$TH to the ECU 6.

An absolute pressure (PBA) sensor 15 is provided in communication via a conduit 14 with the interior of the intake pipe 11 at a location downstream of the throttle valve 12'. The PBA sensor 15 is electrically connected to the ECU 6 to supply an electric signal indicative of the sensed intake pipe absolute pressure PBA to the ECU 6.

An intake temperature (TA) sensor 16 is mounted in a wall of the intake pipe 11 at a location downstream of the conduit 14 to supply an electric signal indicative of the sensed intake temperature TA to the ECU 6.

An atmospheric pressure (PA) sensor 19 is arranged at a suitable location around the engine 1 to supply an electric signal indicative of the sensed atmospheric pressure PA to the ECU 6.

A linear-output type oxygen concentration sensor (hereinafter referred to as "the LAF sensor") 18 is mounted in an exhaust pipe 17 extending from the cylinder block of the engine 1, to supply an electric signal indicative of the sensed oxygen concentration in exhaust gases emitted from the engine 1, to the ECU 6.

An accelerator pedal angle ($\theta$ACC) sensor 20 is connected to an accelerator pedal, not shown, to supply an electric signal indicative of the sensed accelerator pedal angle $\theta$ACC to the ECU 6.

A battery voltage (VB) sensor 21 detects an output voltage of a battery, not shown, which supplies electric power to the fuel injection valves 2, the ECU 6, etc., and supplies its electric output signal to the ECU 6.

The fuel supply system 5 is comprised of a fuel tank 22, a fuel feeding line 23 connecting between the fuel injection valves 2 and the fuel tank 22, a fuel pump (PO) 24 having a predetermined high pressure capacity, arranged across the fuel feeding line 23, a bypass line 25 branching off the fuel feeding line 23 at a location downstream of the fuel pump 24 and communicating with the fuel tank 22, and a fuel pressure control valve (hereinafter referred to as "the EPR valve") 26 arranged across the bypass line 25.

A fuel pressure (PF) sensor 27 is inserted into the fuel feeding line 23 at a location slightly upstream of the fuel injection valves 2, which is also electrically connected to the ECU 6 to supply an electric signal indicative of the sensed fuel supply pressure PF to the ECU 6.

Further, a fuel temperature (TF) sensor 28 formed of a thermistor or the like is inserted into the fuel feeding line 23 at a location slightly upstream of the PF sensor 27 to supply an electric signal indicative of the sensed fuel temperature TF to the ECU 6.

Figure 2:
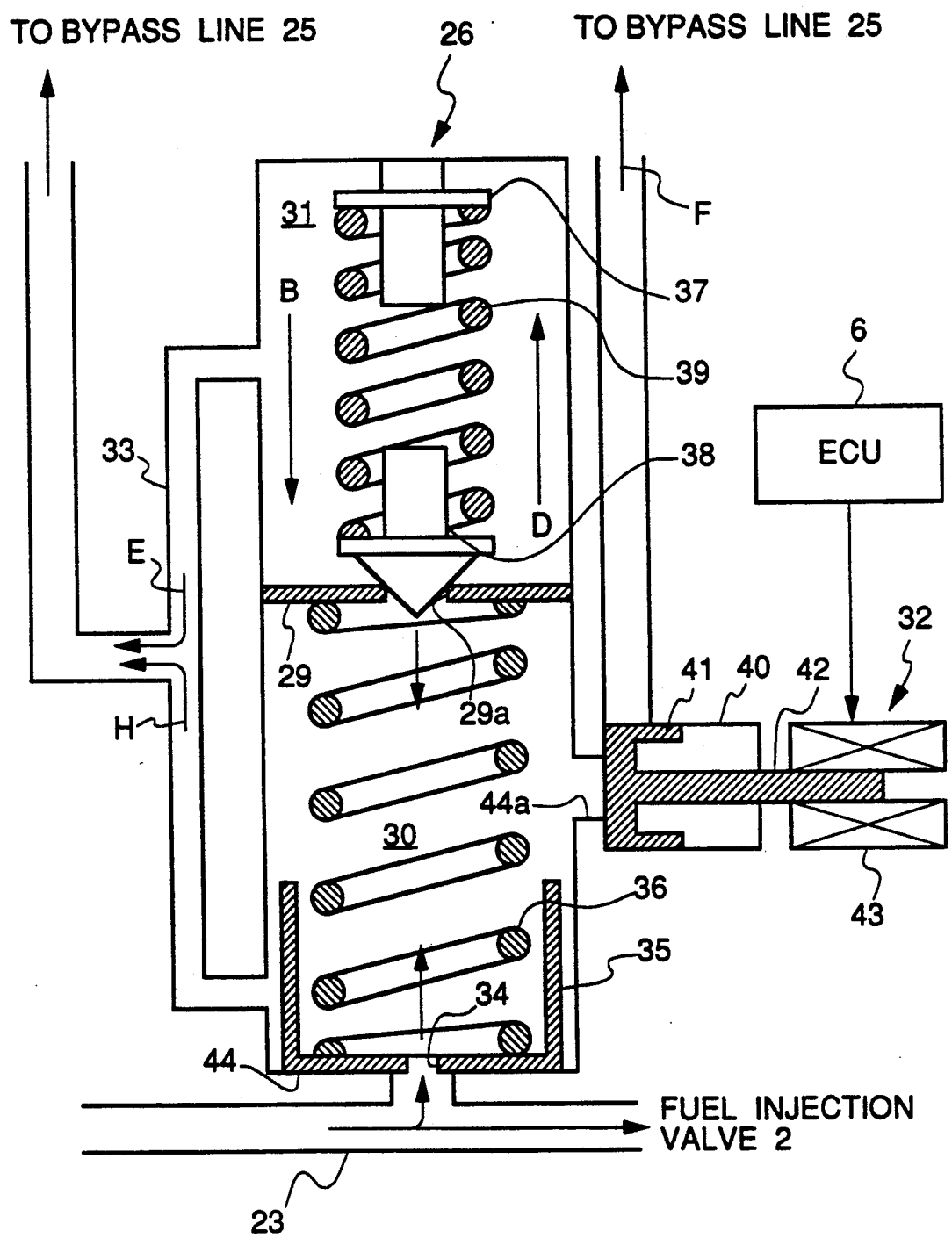
FIG. 2 is a schematic sectional view of a fuel pressure control valve (EPR valve) appearing in FIG. 1.

The EPR valve 26 is constructed as shown in FIG. 2. A casing 44 has its interior divided into a first valve chamber 30 and a second valve chamber 31 by a partition member 29. An electromagnetic valve 32 is attached to a side wall of the first valve chamber 30. The first and second valve chambers 30, 31 are connected with each other via a T-shaped conduit line 33 which communicates with the bypass line 25.

The first valve chamber 30 is comprised of a main valve 35 having a valve element having a generally U-shaped section, which has a central portion formed with a restriction opening 34, and a spring 36 interposed between the main valve 35 and the partition member 29 and urging the main valve 35 in the direction inidcated by the arow A. The second valve chamber 31 is comprised of a spring seat 37 in the form of a pillar downwardly depending from an upper wall of the casing 44 and having a radial flange, a relief valve 38 having a conical end urgingly engageable with a central opening 29a formed in the partition member 29, and a spring 39 interposed between the relief valve 38 and the spring seat 37 and urging the former in the direction indicated by the arrow B.

The electromagnetic valve 32 is comprised of a valve casing 40, the interior of which communicates with the bypass line 25, a valve element 41 having a generally U-shaped section and engageable with an opening 44a formed in the casing 44 for closing and opening same, and a solenoid 43 drivingly coupled to the valve element 41 through a rod 42.

The EPR valve 26 constructed as above operates as follows: Pressurized fuel from the fuel pump 24 is fed into the first valve chamber 30 through the restriction hole 34 of the main valve 35 as indicated by the arrow C so that the fuel supply pressure acts upon the main valve 35 as back pressure. If the electromagnetic valve 32 is then energized to become closed, the back pressure rises to cooperate with the urging force of the spring 36 to block a gap between the main valve 35 and an opposed wall of the casing 44 whereby fuel from the fuel pump 24 is inhibited from leaking into the bypass line 25 so that the fuel supply pressure PF to be supplied to the fuel injection valves 2 rises up to a high level.

When the pressure within the first valve chamber 30 increases above the withstand pressure limit (e.g. 150–200 kg/cm$^2$) of the EPR valve 26, the relief valve 38 moves in the direction indicated by the arrow D against the force of the spring 39 so that fuel leaks from the first valve chamber 30 in the direction indicated by the arrow E to be returned through the bypass line 25 to the fuel tank 22.

On the other hand, when the electromagnetic valve 32 is deenergized to become open, fuel leaks from the first valve chamber 30 through the opening 44a and then flows along the valve casing 40 in the direction indicated by the arrow F to be returned to the bypass line 25, so that the back pressure acting upon the main valve 35 lowers and accordingly the main valve 35 moves in the direction indicated by the arrow G against the force of the spring 36. Consequently, the back pressure leaks through the open gap between the main valve 35 and the casing 44 so that fuel flows to the bypass line 25 as indicated by the arrow H. Accordingly, the fuel supply pressure PF to be supplied to the fuel injection valves 2 lowers. The electromagnetic valve 32 is controlled to close and open with a duty ratio determined by a command signal responsive to a load condition of the engine 1 from the ECU 6 such that fuel from the fuel tank 22 is supplied to the fuel injection valves 2 under desired fuel supply pressure PF.

Figure 3:
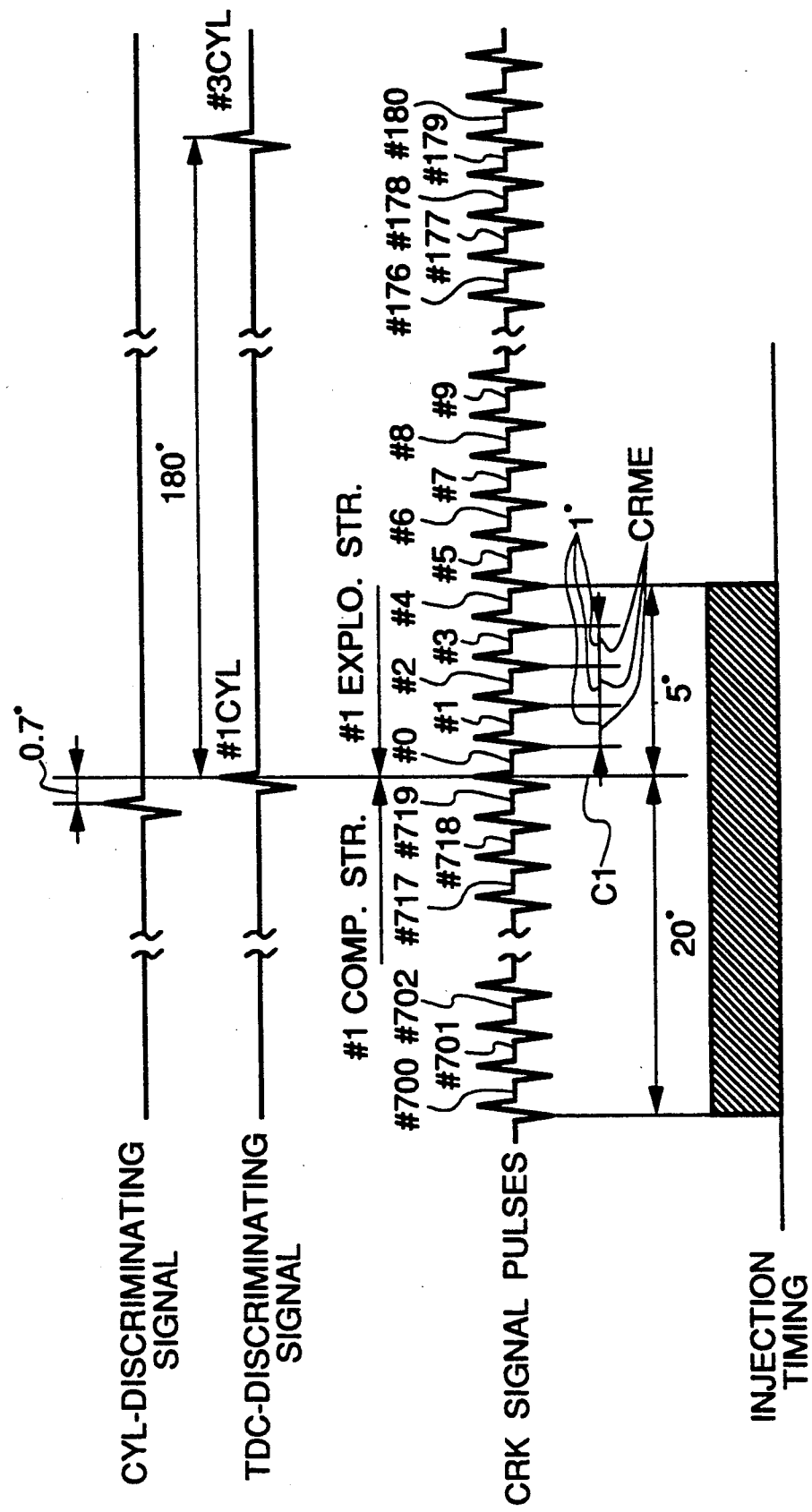
FIG. 3 is a timing chart showing the relationship between timing of CYL-discriminating signal pulses, TDC-discriminating signal pulses, CRK signal pulses and fuel injection timing.

FIG. 3 shows the timing relationship between the CYL-discriminating signal from the CYL sensor 8, the CRK signal from the CRK sensor 10, and the fuel injection timing.

The CRK sensor 10 generates 720 CRK signal pulses at equal crank angle intervals, e.g. crank angle intervals of 1° while the crankshaft rotates through two revolutions or 720 degrees.

The ECU 6 counts CRK signal pulses as clocks and generates a TDC-discriminating signal whenever it counts up 180 pulses, i.e. whenever the crankshaft rotates through 180° degrees to thereby detect a reference crank angle position of each cylinder. Further, the ECU 6 measures time intervals CRME of generation of the CRK signal and accumulates the measured CRME values over a time interval of generation of each TDC-discriminating signal pulse to obtain a value ME to thereby detect the engine rotational speed NE as the reciprocal of the value ME.

The CYL-discriminating signal is generated at a predetermined crank angle position (e.g. 0.7° BTDC) earlier than the position of generation of the TDC-discriminating signal indicative of the end of a compression stroke of a particular cylinder (e.g. #1 CYL), and allocates the number of the particular cylinder (e.g. #1 CYL) to a cylinder corresponding to the TDC-discriminating signal generated immediately after generation of the CYL-discriminating signal.

Further, the ECU 6 detects crank angle stages (hereinafter referred to as "the stage(s)") with reference to the reference crank angle position of each cylinder, from the TDC-discriminating signal and CRK signal pulses. More specifically, for example, when a CRK signal pulse C1 is generated at a TDC position at the end of the compression stroke, if the CRK signal pulse C1 is generated at the same time as the TDC-discriminating signal, the ECU 6 detects stage #0 from the CRK signal pulse C1, and thereafter sequentially detects stages #1, #2, ..., #719 from subsequent CRK signal pulses.

The fuel injection timing of the fuel injection valves 2 is set so as to fall within a predetermined crank angle range within which desired stratified combustion can take place to ensure good exhaust emission characteristics in all engine load regions. More specifically, it is set within a range of 20° BTDC to 5° ATDC of the crank angle with respect to the TDC corresponding to compression stroke. In other words, when the crank angle falls within the range of 20° BTDC to 5° ATDC corresponding to the compression stroke, the fuel injection valve 2 is energized to inject fuel.

Figure 20A:
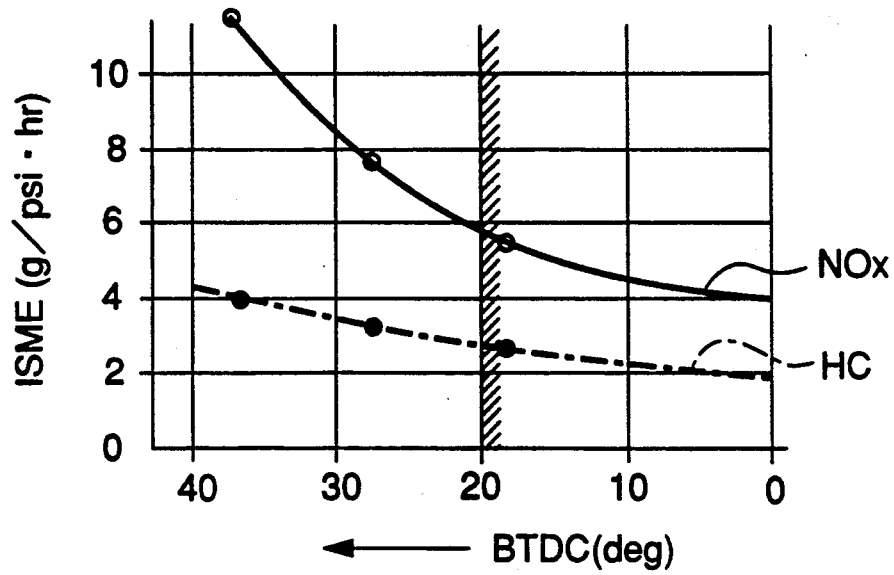
FIG. 20(a) is a graph showing the relationship between exhaust emission characteristics and fuel injection initiation with fuel injection termination held constant.
Figure 20B:
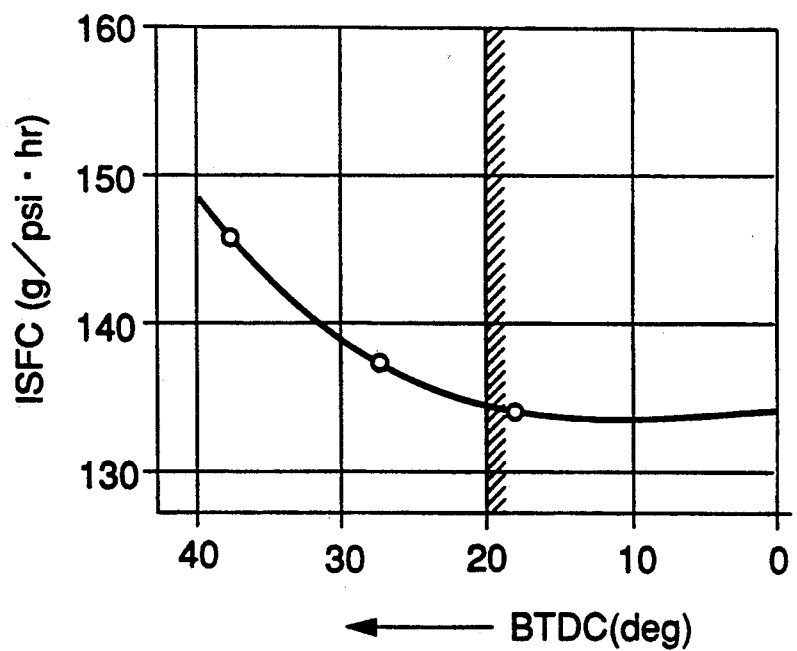
FIG. 20(b) is a graph showing the relationship between fuel consumption and fuel injection initiation with fuel injection termination held constant.

The reason for setting the fuel injection timing as above will be described:

FIGS. 20($a$) and ($b$) show exhaust emission characteristics and fuel consumption which are obtained when fuel injection initiation is varied with fuel injection termination held at a constant value (5° ATDC). In the figures, the abscissa represents the crank angle (BTDC) corresponding to fuel injection initiation, and the ordinate represents exhaust emission amounts ISME (g/psi, hr) in FIG. 20($a$) and fuel consumption ISFC (g/psi, hr) in FIG. 20($b$) (cf.: 1 psi ($1lb/in^2$)$\approx 7.03 \times 10^{-2} kg/cm^2$). In FIG. 20($a$), the solid line indicates the emission amount of NOx, and the chain line the emission amount of HC. As will be learned, from FIGS. 20($a$), ($b$), when the fuel injection initiation (crank angle) is within 20° or less BTDC, both good exhaust emission characteristics and reduced fuel consumption can be obtained.

Figure 21A:
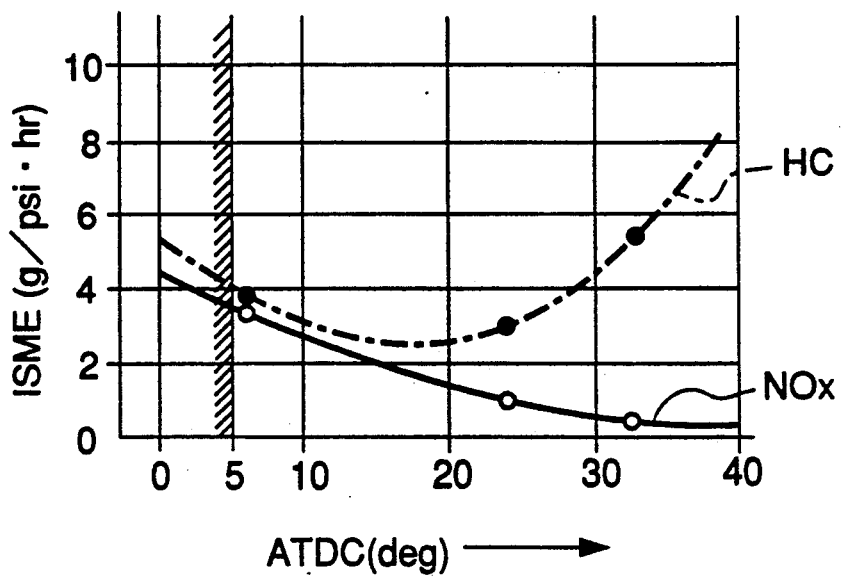
FIG. 21(a) is a graph showing the relationship between exhaust emission characteristics and fuel injection termination with fuel injection initiation held constant.
Figure 21B:
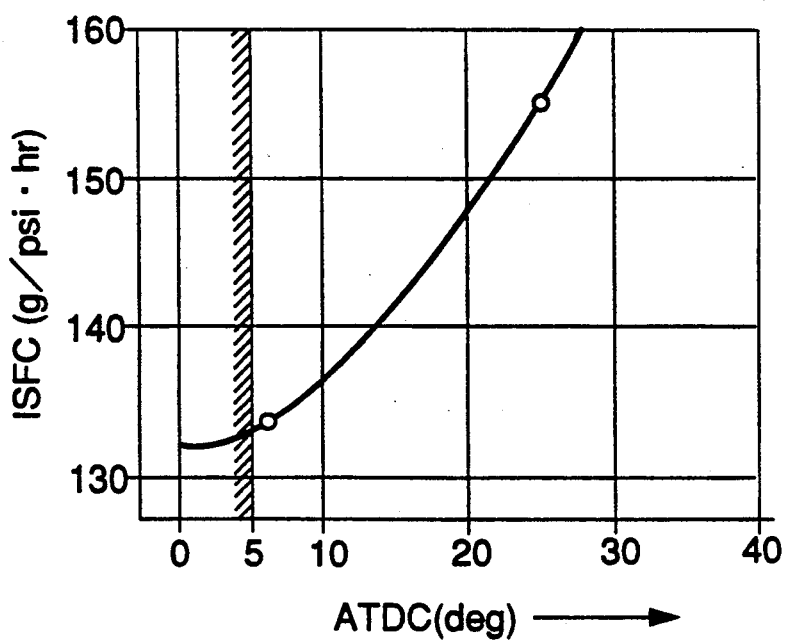
FIG. 21(b) is a graph showing the relationship between fuel consumption and fuel injection termination with fuel injection initiation held constant.

FIGS. 21($a$) and ($b$) show exhaust emission characteristics and fuel consumption which are obtained when the fuel injection termination is varied with the fuel injection initiation held at a constant value (10° BTD). In the figures, the abscissa represents the crank angle (ATDC) corresponding to the fuel injection termination, and the ordinate represents exhaust emission amounts ISME (g/psi. Ahr) in FIG. 21($a$) and fuel consumption ISFC (g/psi. Ahr) in FIG. 21($b$). In FIG. 21($a$), the solid line indicates the emission amount of NOx, the solid line indicates the emission amount of HC. As will be learned from FIGS. 21($a$), ($b$), the exhaust emissions ISME shows good results when the injection end falls within a crank angle range of 10° ATDC to 20° ATDC, however, within this crank angle range, an excessive amount of fuel is supplied to the combustion chamber, degrading the fuel consumption ISFC. Therefore, it will be understood from FIGS. 21($a$), ($b$) that a range of 5° or less ATDC of fuel injection termination is acceptable for satisfying both exhaust emission characteristics and fuel consumption characteristics.

By setting the crank angle range to the range of 20° BTDC to 5° ATDC for the reason explained above, an optimal amount of fuel required for fuel combustion can be supplied to the combustion chamber of the cylinder to effect stratified combustion of fuel while good emission characteristics are ensured.

Figure 4:
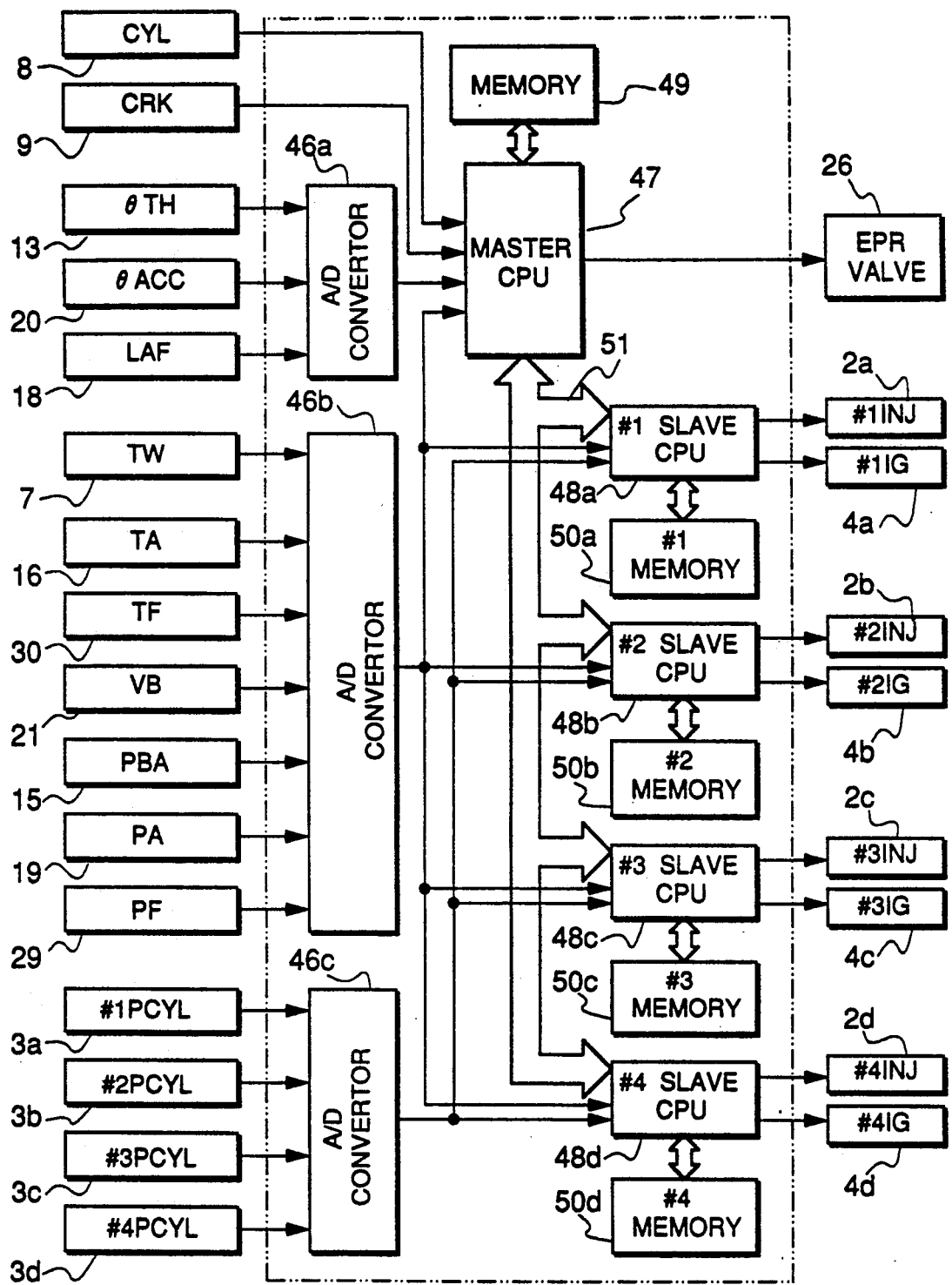
FIG. 4 is a block diagram of the arrangement of a control system employed in the fuel injection control system.

FIG. 4 shows the arrangement of the control system of the fuel injection control system according to the present embodiment. The ECU 6 comprises A/D converters 46$a$–46$c$, which convert analog signals outputted from various sensors as mentioned before to digital signals, a first central processing unit (hereinafter referred to as "the master CPU") 47, which carries out calculation of a desired fuel injection amount QM, control of the EPR valve 26, etc., four second central processing units (hereinafter referred to as "the slave CPU's") 48$a$–48$d$, which control the fuel injection timing and ignition timing of respective corresponding cylinders, and memories 49, 50$a$–50$d$ formed of ROM's storing various operational programs executed by the master CPU 47 and the slave CPU's 48$a$–48$d$ and various maps, hereinafter described, and RAM's for storing calculation results, etc. The master CPU 47 and the slave CPU's 48$a$–48$d$ are connected with each other via a data bus 51.

In the fuel injection control system constructed as above, output signals from the CYL sensor 8, and the CRK sensor 10 have their waveforms shaped by waveform shaper circuits, not shown, and then supplied to the master CPU 47.

Analog output signals from the $\theta$TH sensor 13, $\theta$ACC sensor 20 and LAF sensor 18 have their levels shifted to a predetermined level by a level shifter unit, not shown, and then are successively supplied to the A/D converter 46$a$ via a multiplexer, not shown, to be converted to digital signals which are supplied to the master CPU 47.

Similarly, analog output signals from the TW sensor 7, TA sensor 16, TF sensor 28, VB sensor 21, PBA sensor 15, PA sensor 19, and PF sensor 27 are also fed through a level shifter unit and a multiplexer to the A/D converter 46$b$ to be converted to digital signals which are supplied to the master CPU 47 as well as to the #1-#4 slave CPU's 48$a$–48$d$.

Further, analog output signals from the #1-#4 PCYL sensors 3$a$-3$d$ are also fed through a level shifter unit and a multiplexer to the A/D converter 46$c$ to be converted to digital signals which are supplied to the respective #1-#4 slave CPU's 48$a$–48$d$ corresponding, respectively, to the #1-#4 PCYL sensor 3$a$-3$d$.

The master CPU 47 calculates the desired fuel injection amount QM based upon the engine rotational speed NE and the accelerator pedal angle $\theta$ACC sensed by the $\theta$ACC sensor 20 as the load condition-detecting means, determines a desired fuel pressure PFM based upon the engine rotational speed NE and the accelerator pedal angle $\theta$ACC, and controls the EPR valve 26 so that the fuel supply pressure PF becomes equal to the determined desired fuel pressure PFM.

The #1-#4 slave CPU's 48$a$–48$d$ calculate the fuel injection initation for the respective cylinders such that fuel injection can be effected within the range of 20° BTDC to 5° ATDC, sequential decrement processing of the fuel injection amount for the respective cylinders by sequential decrement means can be executed, hereinafter described, in response to the calculated fuel injection initation of the respective cylinders to control the fuel injection termination for the respective cylinders, and also the ignition timing by the spark plugs 4a–4d can be controlled for the respective cylinders in response to the fuel injection timing of the fuel injection valves 2a–2d and operating conditions of the engine.

Figure 5:
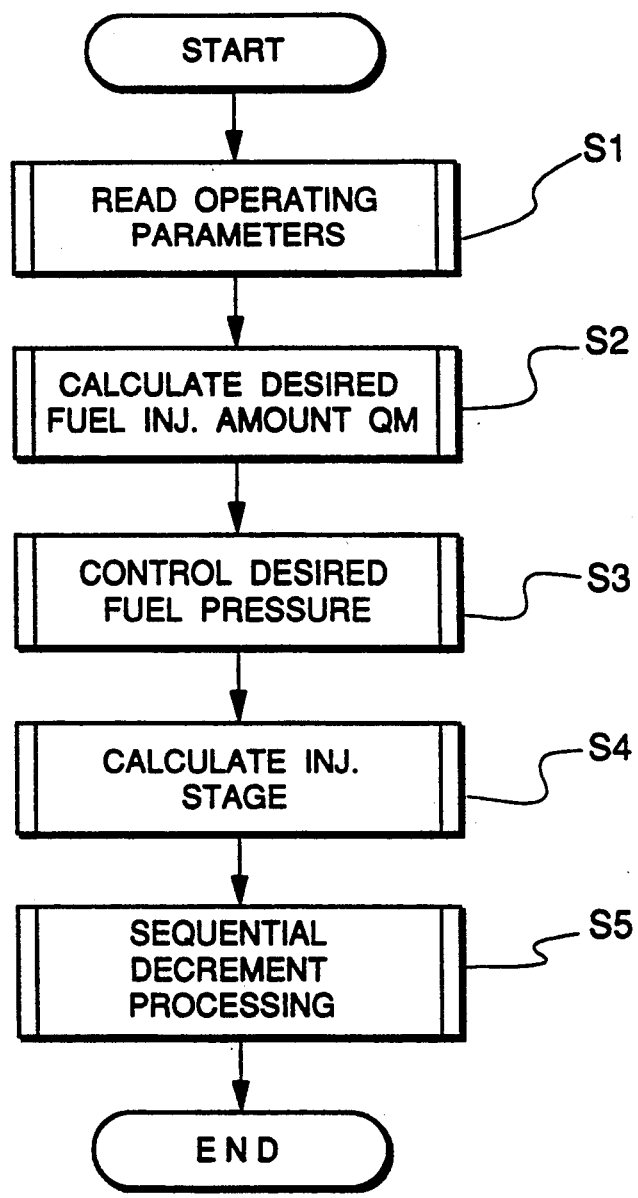
FIG. 5 is a flowchart of a main routine for carrying out control by the fuel injection control system.

FIG. 5 shows a main routine for carrying out the fuel injection control, which is executed by the present fuel injection control system.

First, engine operating parameters detected by the aforementioned various sensors are inputted to the master CPU 47 and the slave CPU's 48a–48d, to be stored into the memories 49, and 50a–50d corresponding, respectively, to the CPU's 47, and 48a–48d, at a step S1. The engine operating parameters inputted to the master CPU 47 are processed by background processing, while those inputted to the #1–#4 slave CPU's 48a–48d are processed in synchronism with the operation of a timer generating false signal pulses at predetermined time intervals. Then, the master CPU 47 calculates the desired fuel injection amount QM in accordance with values of engine operating parameters at a step S2, determines the desired fuel pressure PFM and carries out feedback control of the fuel supply pressure PF supplied to the fuel injection valves 2 from the EPR valve 26 such that the fuel supply pressure PF becomes equal to the desired fuel pressure PFM, at a step S3. The #1–#4 slave CPU's 48a–48d calculate an injection stage ISTG at which fuel injection is to be started for the respective cylinders, in accordance with engine operating parameters and starts fuel injection at the calculated injection initiation timing, at a step S4. Finally, the #1–#4 slave CPU's 48a–48d execute the sequential decrement processing of the fuel injection amount (sequential decrement means) for the respective cylinders #1–#4 CYL to control the fuel injection termination in response to fluctuations in the cylinder pressure PCYL, so as to terminate the fuel injection for the present cycle of operation when the desired fuel injection amount QM is reached, at a step S5. Then, the program is terminated.

Details of the control procedures of the steps S2–S5 in FIG. 5 will now be described:

(i) Calculation of Desired Fuel Injection Amount QM (Step S2)

Figure 6:
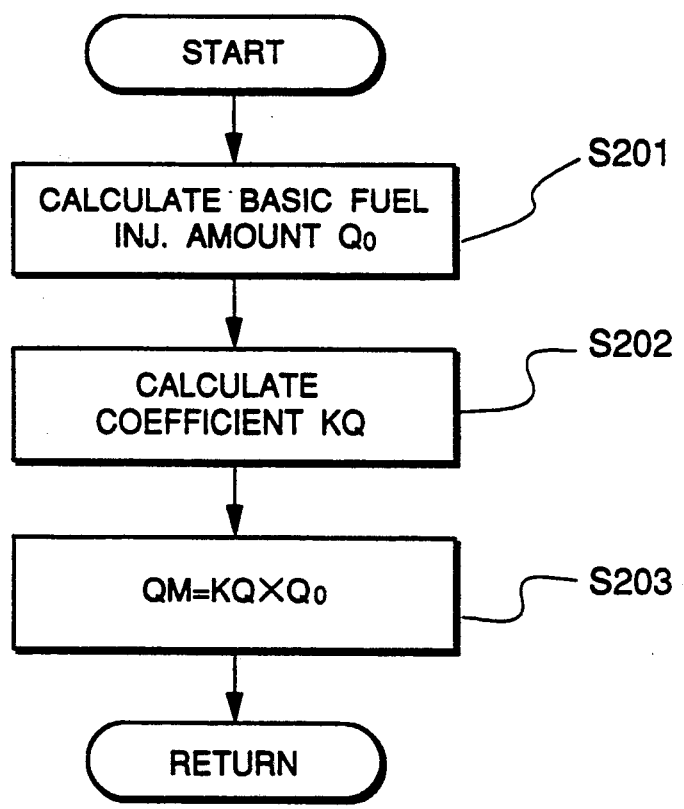
FIG. 6 is a flowchart of a routine for calculating a desired fuel injection amount.

Calculation of the desired fuel injection amount QM is executed by means of a program shown in FIG. 6, whenever the crankshaft rotates through a predetermined crank angle, e.g. in synchronism with generation of the TDC-discriminating signal.

Figure 7:
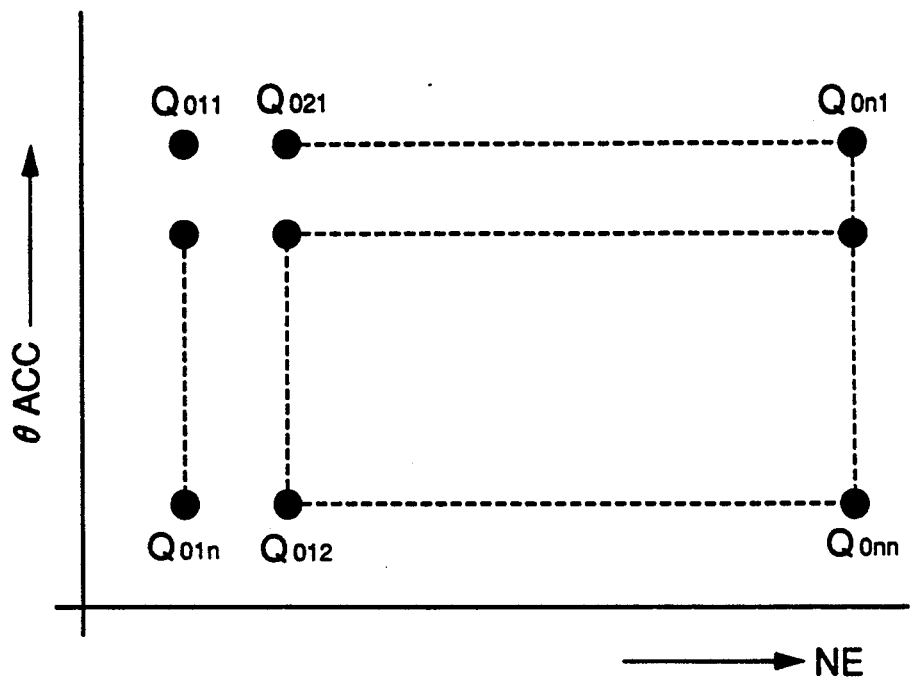
FIG. 7 shows a $Q_0$ map for determining a basic fuel injection amount $Q_0$.

First, a value of a basic fuel injection amount $Q_0$ is read from a $Q_0$ value stored in a ROM of the memory 49 and the read $Q_0$ map is stored into a RAM of the memory 49, at a step S201. An example of the $Q_0$ map is shown in FIG. 7. In the $Q_0$ map, there are provided a plurality of predetermined $Q_0$ values $Q_{011}$–$Q_{0nn}$ set in accordance with the engine rotational speed NE to be sensed by the CRK sensor 10 and an engine operating parameter indicative of load on the engine, e.g. accelerator pedal angle $\theta$ACC to be sensed by the $\theta$ACC sensor 20. By retrieving the $Q_0$ map, a value of the basic fuel injection amount $Q_0$ is read from the $Q_0$ map in accordance with sensed values of the engine rotational speed NE and the accelerator pedal angle $\theta$ACC, and the read $Q_0$ value is stored into the RAM of the memory 49. As is clear from the $Q_0$ map of FIG. 7, the higher the engine rotational speed NE and/or the higher the engine load, the greater $Q_0$ value is read. If the sensed NE and/or $\theta$ACC value assumes a value other than the predetermined NE and/or $\theta$ACC values of the $Q_0$ map, the $Q_0$ value is calculated by interpolation.

Figure 8:
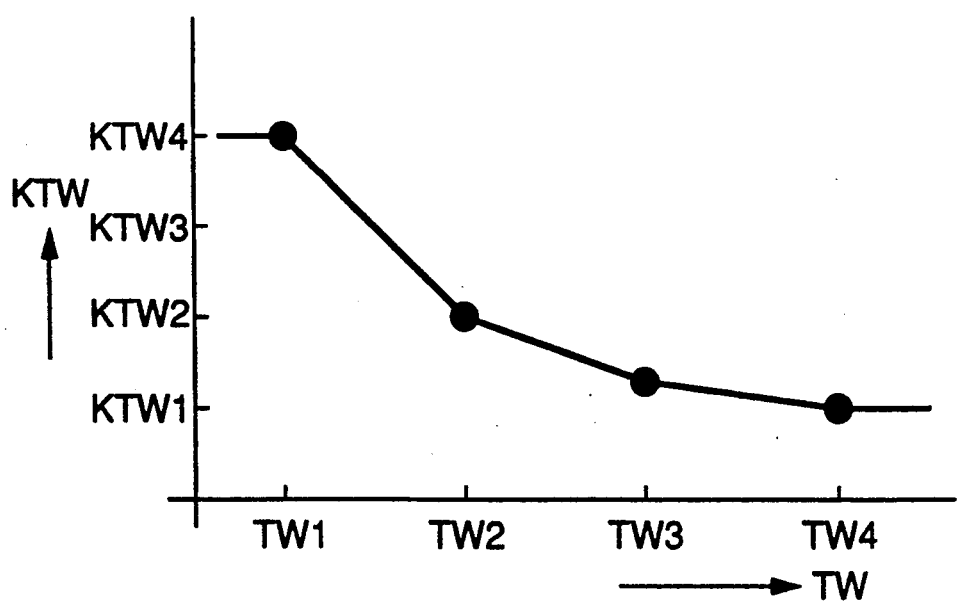
FIG. 8 shows a KTW map for determining an engine coolant temperature-dependent correction coefficient.

Next, a fuel injection amount-correction coefficient KQ is calculated at a step S202. This correction coefficient KQ is calculated by multiplying correction coefficients dependent upon the intake temperature TA, engine coolant temperature TW, etc. More specifically, it is calculated by the use of the following equation (1):

$$KQ = KTW \times KTA \times KTF \times KPA \qquad (1)$$

where KTW is a coolant temperature-dependent correction coefficient set in dependence on the engine coolant temperature TW, and is read, e.g. from a KTW map shown in FIG. 8 stored in the ROM of the memory 49, in which there are provided predetermined KTW values KTW1–KTW4 corresponding, respectively, to predetermined TW values TW1–TW4.

KTA, KTF, and KPA are an intake temperature (TA)-dependent correction coefficient, a fuel temperature (TF)-dependent correction coefficient, and an atmospheric pressure (PA)-dependent correction coefficient, respectively, which are read, respectively, from a KTA map, a KTF map and a KPA map stored in the ROM of the memory 49, none of which is shown. In the above-mentioned KTW, KTA, KTF, and KPA maps, when the sensed values of the operating parameters of the maps assume values other than the predetermined parameter values, the coefficient values are calculated by interpolation.

Then, the program proceeds to a step S203 where the desired fuel injection amount QM is calculated by the use of the following equation (2), and the calculated value is stored into the RAM of the memory 49, followed by the program returning to the main routine in FIG. 5:

$$QM = KQ \times Q_0 \qquad (2)$$

(ii) Control of Desired Fuel Pressure (Step S3)

Figure 9:
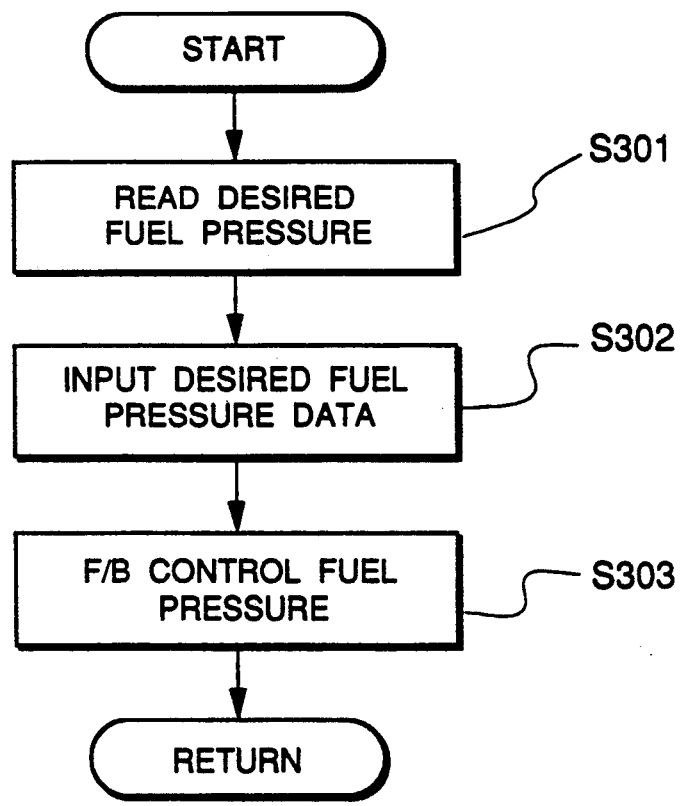
FIG. 9 is a flowchart showing a routine for controlling fuel pressure.

The desired fuel pressure control routine is shown in FIG. 9, which is executed whenever the crankshaft rotates through a predetermined crank angle, e.g. in synchronism with generation of the TDC-discriminating signal.

Figure 10:
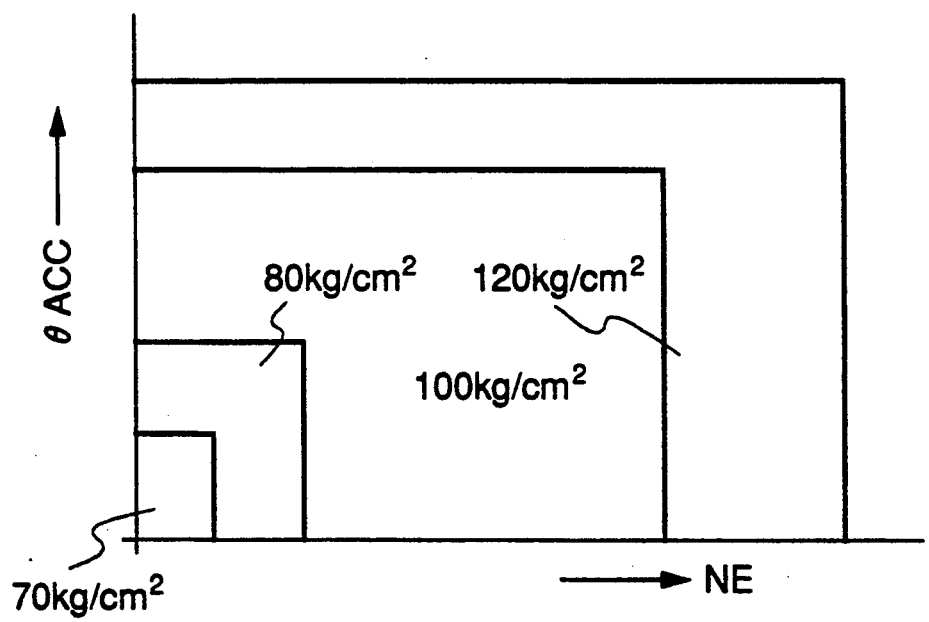
FIG. 10 shows a PFM map for determining desired fuel supply pressure PFM.

First, a fuel pressure map (PFM map) stored in the ROM of the memory 49 is retrieved to determine a value of the desired fuel pressure PFM corresponding to a value of the desired fuel injection amount QM obtained by the QM calculation routine in FIG. 6 and the engine rotational speed NE, and the calculated PFM value is stored into the RAM of the memory 49, at a step S301. At the desired fuel pressure PFM, higher predetermined pressure values than respective corresponding values of the cylinder pressure PCYL are selected insofar as the engine rotational speed NE and the accelerator pedal angle $\theta$ACC assume the same values for calculating or estimating the PFM and PCYL values. To be concrete, by retrieving the PFM map, a higher predetermined fuel pressure value (70–120 kg/cm$^2$) than a corresponding value of the cylinder pressure PCYL is read from the PFM map and stored into the RAM of the memory 49. An example of the PFM map is shown in FIG. 10. As shown in the figure, a plurality of fuel pressure regions (70–120 kg/cm$^2$) are provided, which correspond, respectively, to different combinations of value ranges of the engine rotational speed NE and the accelerator pedal angle $\theta$ACC, in such a manner that the higher the NE value and/or the higher the $\theta$ACC value, the higher the PFM value is selected. For example, for a full load engine operation, the PFM value is set to a very high value so that the calculated desired fuel injection amount QM can be completely injected at such a full load engine operation. In addition, as mentioned above, the same parameter, i.e. accelerator pedal angle $\theta$ACC is used for determining the desired fuel injection amount QM as the desired fuel pressure PFM, and accordingly a read value of the desired fuel pressure PFM is actually commensurate with a read value of the desired fuel injection amount QM.

Next, the read value of the desired fuel pressure PFM is converted to an electric signal, which is then supplied to the EPR value 26 as a driving signal, at a step S302. Then, feedback control of the fuel supply pressure PF is carried out so that the actual fuel supply pressure PF sensed by the PF sensor 27 becomes equal to the desired fuel pressure PFM, at a step S303, followed by the program returning to the main routine of FIG. 5.

(iii) Calculation of Injection Stage ISTG (Step S4)

Figure 11:
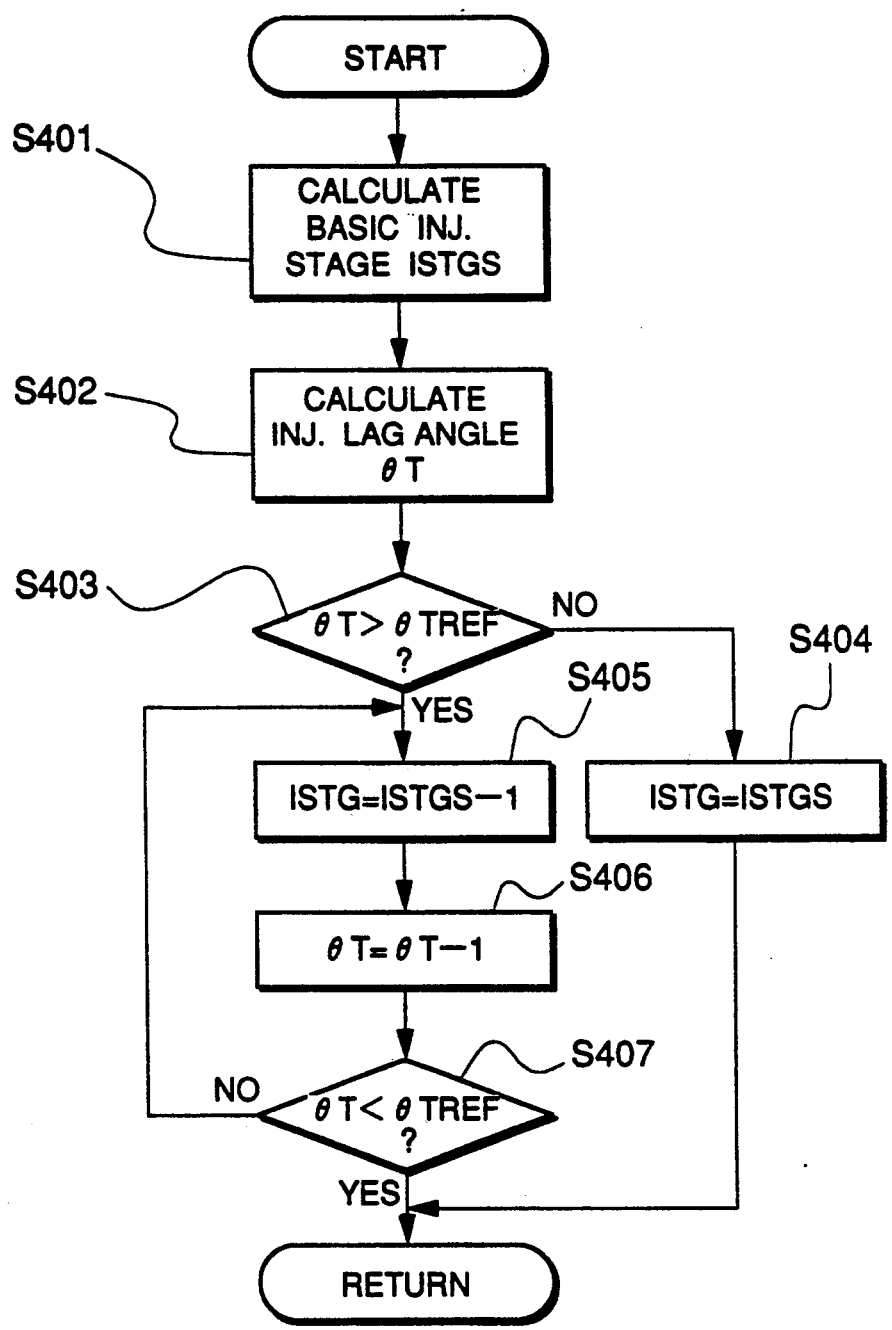
FIG. 11 is a flowchart of a routine for calculating an injection stage ISTG.

Calculation of the injection stage ISTG is executed by a program shown in FIG. 11 whenever the crankshaft rotates through a predetermined crank angle, e.g. in synchronism with generation of the TDC-discriminating signal, for each of the cylinders by the respective slave CPU's 48a–48d.

The following explanation refers only to calculation of an injection stage ISTG for the cylinder #1 CYL, but the same control procedure applies to the other cylinders #2 CYL–#4 CYL.

Figure 12:
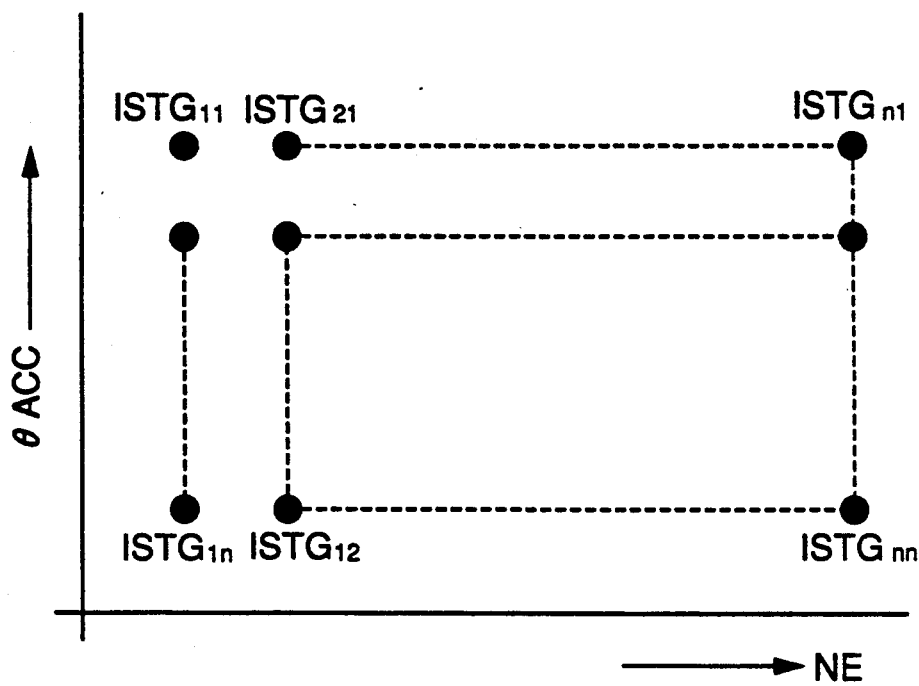
FIG. 12 shows an ISTGS map for determining a basic injection stage ISTGS.

First, an ISTGS map stored in a ROM of the #1 memory 50a is retrived to calculate a basic injection stage ISTGS for starting fuel injection, at a step S401. The ISTGS map is shown, by way of example, in FIG. 12. In the ISTGS map, there are provided a plurality of predetermined ISTGS values $ISTG_{11}$–$ISTG_{nn}$ corresponding, respectively, to different combinations of values of the engine rotational speed NE and the accelerator pedal angle $\theta$ACC. The predetermined ISTGS values are set to such crank angle values as cover all possible engine load regions, i.e. crank angles falling within the aforementioned fuel injection timing range of 20° BTDC to 5° ATDC. In other words, the predetermined ISTGS values are set to correspond to stages #700 to #5. That is, as mentioned before, to satisfy requirements of both exhaust emission characteristics and fuel consumption at the same time, the crank angle range of 20° BTDC to 5° ATDC is optimal as the fuel injection timing, and therefore the predetermined ISTGS values $ISTG_{11}$–$ISTG_{nn}$ are set to correspond to the above crank angle range of 20° BTDC to 5° ATDC. By retrieving the ISTGS map, the basic injection stage ISTGS is determined in accordance with the engine rotational speed NE and the accelerator pedal angle $\theta$ACC, and the determined ISTGS value is stored into a RAM of the #1 memory 50a.

Figure 13:
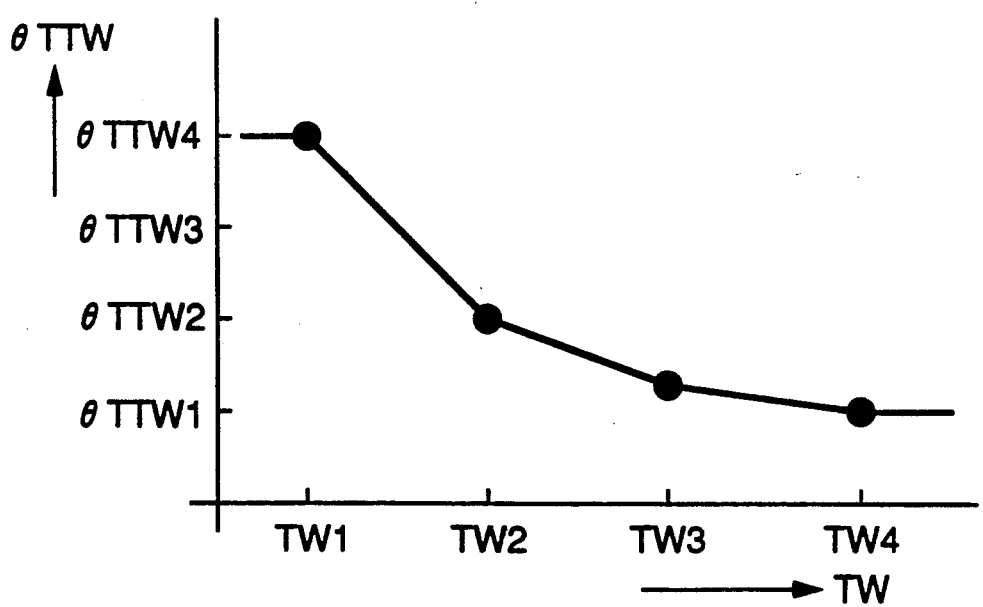
FIG. 13 shows a $\theta$TTW map for determining a first delay angle $\theta$TTW dependent upon engine coolant temperature.

Then, the program proceeds to a step S402 to calculate an injection lag angle $\theta$T by the following equation (3). The injection lag angle $\theta$T is a crank angle corresponding to an injection time lag attributable to a so-called ineffective time period of the fuel injection valve 2a due to viscosity of fuel dependent upon the fuel temperature, the ambient temperature, etc., and a drop in the output voltage VB of the battery:

$$\theta T=(\theta TTW+\theta TTF+\theta TTLDLY)/CRME \ldots (3)$$

where $\theta$TTW represents a first time lag angle dependent upon, e.g. the engine coolant temperature TW, which is read from a $\theta$TTW map shown in FIG. 13, which is stored in the ROM of the #1 memory 50a in which there are provided predetermined time lag angle values $\theta TTW1$–$\theta TTW4$ corresponding, respectively, to predetermined coolant temperature values TW1–TW4. According to the $\theta$TTW map, the lower the engine coolant temperature, the greater value the first time lag angle is set to, since the lower the engine coolant temperature, the higher the fuel viscosity and hence the longer the injection time lag. $\theta$TTF represents a second time lag angle dependent upon the fuel temperature TF and is read from a $\theta$TFF map, not shown, which is set similarly to the $\theta$TTW map.

Figure 14:
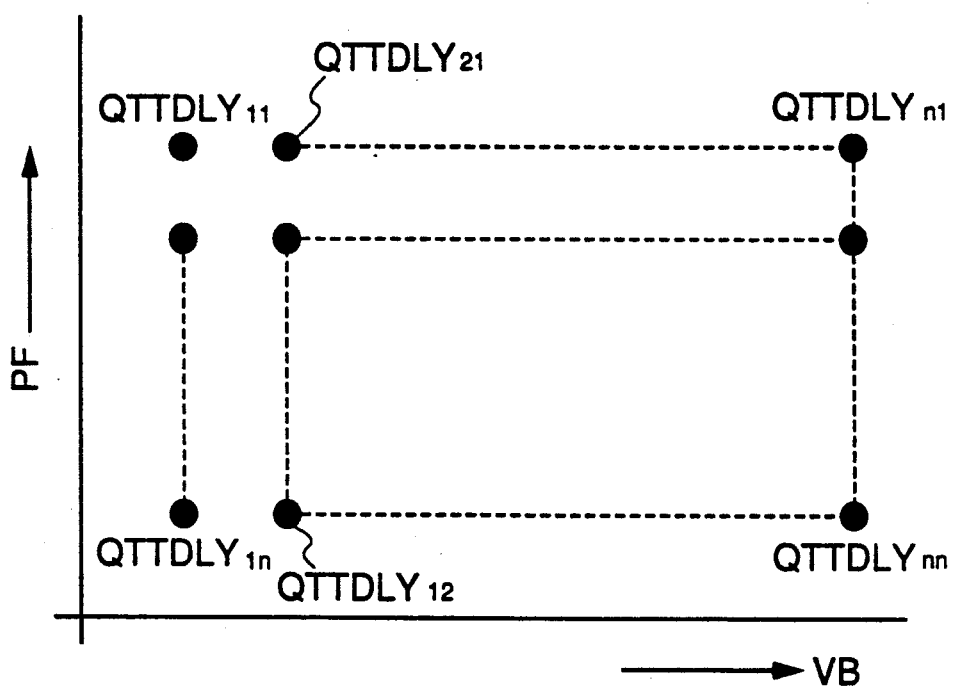
FIG. 14 shows a $\theta$TTDLY map for determining a third delay angle $\theta$TTDLY dependent upon battery voltage VB.

$\theta$TTDLY represents a third time lag angle which compensates for a valve opening delay due to a drop in the output voltage VB of the battery and is read from a $\theta$TTDLY map shown in FIG. 14 and stored in the #1 memory 50a. In the $\theta$TTDLY map, there are provided predetermined $\theta$TTDLY values $\theta TTDLY_{11}$–$\theta TTDLY_{nn}$ corresponding, respectively, to different combinations of values of the battery output voltage VB and the fuel supply pressure PF.

Then, the program proceeds to a step S403, where it is determined whether or not the injection lag angle $\theta$T is greater than a predetermined value $\theta$TREF (e.g. 0.5°). If the answer is negative (NO), it is judged that fuel injection can be started at the basic injection stage ISTGS, and then the basic injection stage ISTGS is set to the injection stage ISTG at a step S404, followed by the program returning to the main routine of FIG. 5. That is, if $\theta T \leq \theta TREF$, no correction is made of the injection stage ISTG and fuel injection is started at the basic injection stage ISTGS.

On the other hand, if $\theta T > \theta TREF$ at the step S403, to start fuel injection at the basic injection stage ISTGS, the injection stage has to be corrected, because of a large injection time lag. That is, to avoid an injection delay, the injection stage ISTG is set to a stage immediately preceding the basic injection stage ISTGS at a step S405, and the injection lag angle $\theta$T is set to ($\theta T - 1$) at a step S406. It is then determined at a step S407 whether or not the thus newly set injection lag angle $\theta$T is smaller than the above predetermined injection lag angle $\theta$TREF (e.g. 0.5°). If $\theta T < \theta TREF$, the program returns to the FIG. 5 main routine. In this case, by setting the injection stage ISTG to (ISTGS−1), the actual fuel injection is started at the basic injection stage ISTGS.

If $\theta T \geq \theta TRF$ at the step S407, i.e. the injection time lag is so large that even if the injection stage ISTG is set to (ISTG=ISTGS−1) at the step S405, the actual fuel injection cannot be effected at the basic injection stage ISTGS, because of the magnitude of the injection time lag. Therefore, the steps S405 and S406 are repeatedly executed until the answer to the step S407 becomes affirmative (YES). If the affirmative answer is obtained at the step S407, it is judged that fuel injection can be effected at the basic injection stage ISTGS, and then the program returns to the FIG. 5 main routine.

Thus, since when the injection lag angle $\theta$T is greater than the predetermined injection lag angle $\theta$TREF, the actual fuel injection cannot be effected at the basic injection stage ISTGS, the injection stage is corrected for the injection time lag so as to always enable the actual fuel injection to be started at the basic injection stage ISTGS.

(iv) Sequential Decrement Processing (Step S5)

The sequential decrement processing is effected in order to reduce variations in the actual fuel injection amount, which are caused by a high temperature inside the cylinder and a large change in the cylinder pressure. In the sequential decrement processing, a fuel injection amount QSAMP (hereinafter referred to as "the sampling fuel amount") to be injected in the present loop is sequentially calculated in response to the difference between the fuel supply pressure PF controlled by the fuel supply pressure routine (=the desired fuel pressure PFM) and the cylinder pressure PCYL sensed by the PCYL sensor 3, and the calculated sampling fuel amount QSAMP is sequentially substracted from the desired fuel injection amount QM to thereby control the fuel injection termination.

In this connection, the PCYL sensor 3 can undergo an output error due to temperature change, etc. If the output error exceeds a tolerance limit, no reliable sensed value of the cylinder pressure is obtained making it impossible to accurately control the injection timing.

Therefore, in the present embodiment, before effecting the sequential decrement processing, calibration of the PCYL sensor 3 is carried out. The sensor calibration is made with reference to the absolute pressure PBA within the intake pipe 11 sensed by the PBA sensor 15 during the suction stroke, as the reference pressure. That is, the cylinder pressure assumed during the suction stroke is almost equal to atmospheric pressure, and therefore can be used as the reference pressure for calibration of the PCYL sensor 3.

Figure 15:
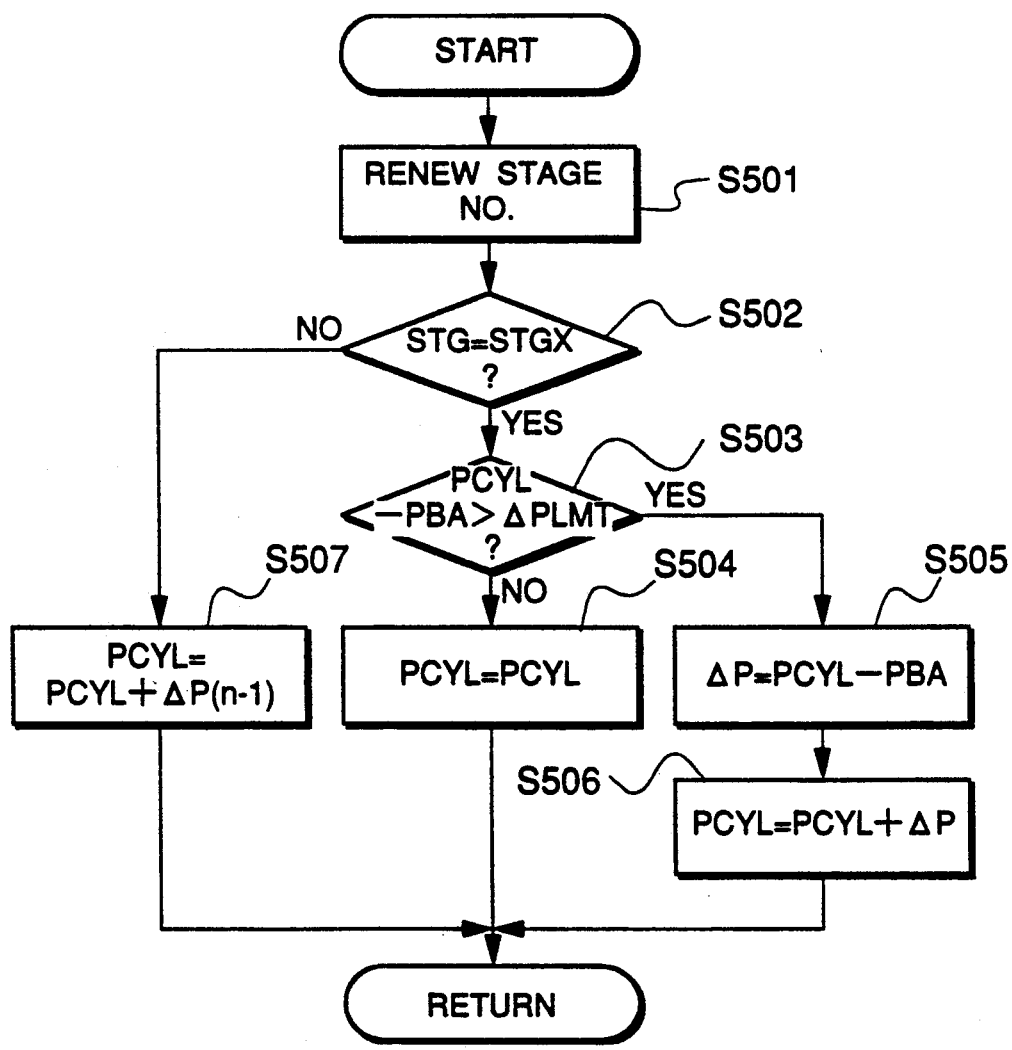
FIG. 15 is a flowchart of a routine for calibrating a cylinder pressure sensor.

FIG. 15 shows a routine for effecting calibration of the PCYL sensor 3 which is executed whenever the crankshaft rotates through a predetermined angle, e.g. in synchronism with generation of the TDC-discriminating signal.

The following description refers only to the cylinder #1 CYL, but the same description can apply to the other cylinders #2 CYL-#4 CYL.

A stage number STG is sequentially renewed whenever a CRK signal pulse is generated, at a step S501, and it is determined at a step S502 whether or not the renewed stage number STG has reached a predetermined stage number STGX. The predetermined stage number STGX is set e.g. to 9° ATDC during the suction stroke, i.e. stage #450. If the answer is affirmative (YES), it is determined at a step S503 whether or not the difference between the cylinder pressure PCYL and the intake pipe absolute pressure PBA (which is almost equal to atmospheric pressure, as mentioned above) is greater than a predetermined tolerance limit ΔPLMT (e.g. 50 mmHg). If the answer is negative (NO), it is judged that the output value from the PCYL sensor 3 need not be corrected (PCYL=PCYL), at a step S504, followed by terminating the program.

On the other hand, if the answer to the question of the step S503 is affirmative (YES), the difference ΔP between the cylinder pressure PCYL sensed by the #1 PCYL sensor 3a and the intake pipe absolute pressure PBA sensed by the PBA sensor 15 is determined at a step S505, and the determined pressure difference ΔP is added to the sensed cylinder pressure PCYL to obtain a corrected cylinder pressure value PCYL at a step S506, followed by terminating the program. Thus, the value obtained by adding the pressure difference ΔP to the cylinder pressure value PCYL obtained by the #1 PCYL sensor 3a is used as a true cylinder pressure value PCYL in the sequential decrement processing, hereinafter described.

If the answer to the question of the step S502 is negative (NO), the pressure difference $\Delta P_{(n-1)}$ obtained in the last loop is added to a cylinder pressure value PCYL obtained by the #1 PCYL sensor 3a, and the resulting sum $(PCYL+\Delta P_{(n-1)})$ is employed as the cylinder pressure PCYL, at a step S507, followed by terminating the program. Similarly to the above, the sum $(PCYL+\Delta P_{(n-1)})$ is used in the sequential decrement processing.

Figure 16:
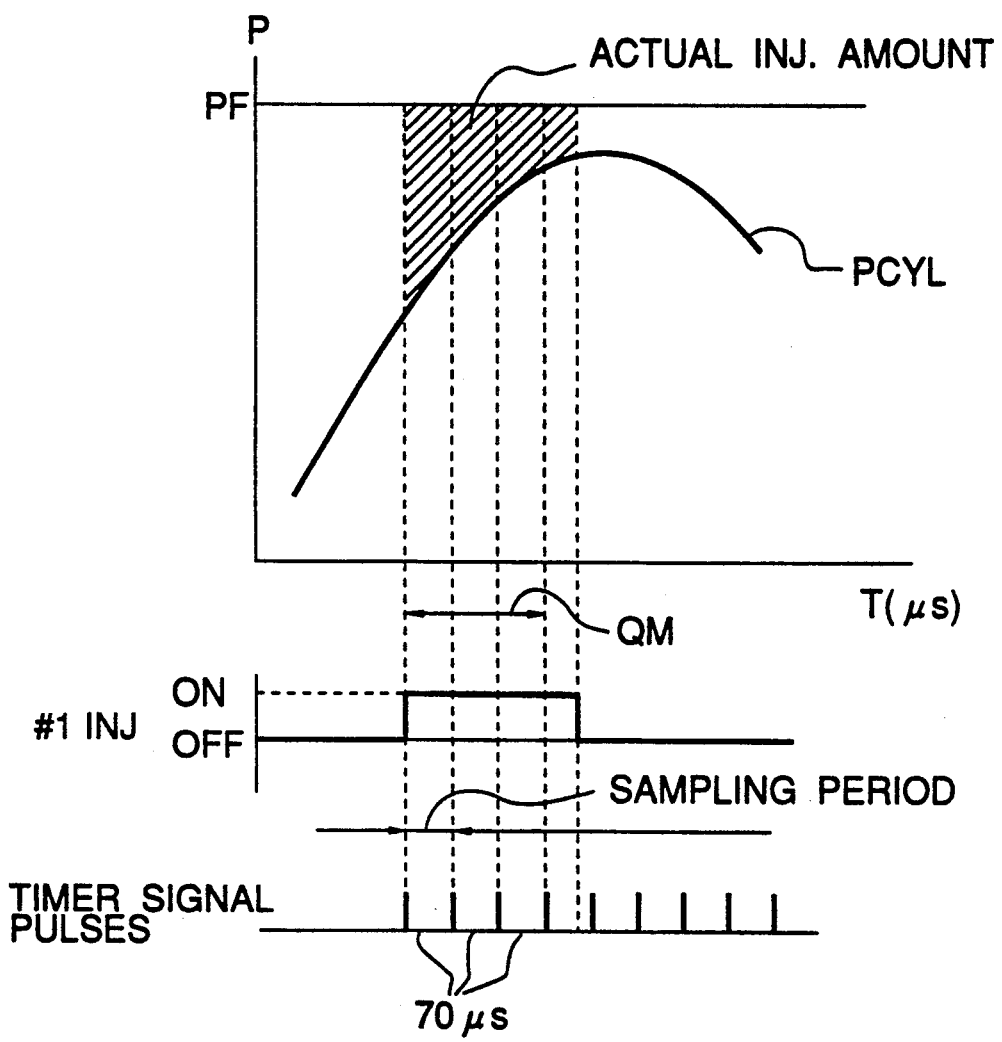
FIG. 16 is a timing chart showing a manner of sequential decrement of fuel injection amount.

FIG. 16 is a timing chart useful in explaining the sequential decrement processing. In the present embodiment, a false signal pulse is generated at predetermined time intervals, e.g. 70 μs, by a timer, not shown, provided within the ECU 6, and the actual fuel injection amount is sequentially calculated whenever a false signal pulse is generated so that fuel injection can be completed when the desired fuel injection amount has been injected, even with a change in the cylinder pressure.

Figure 17:
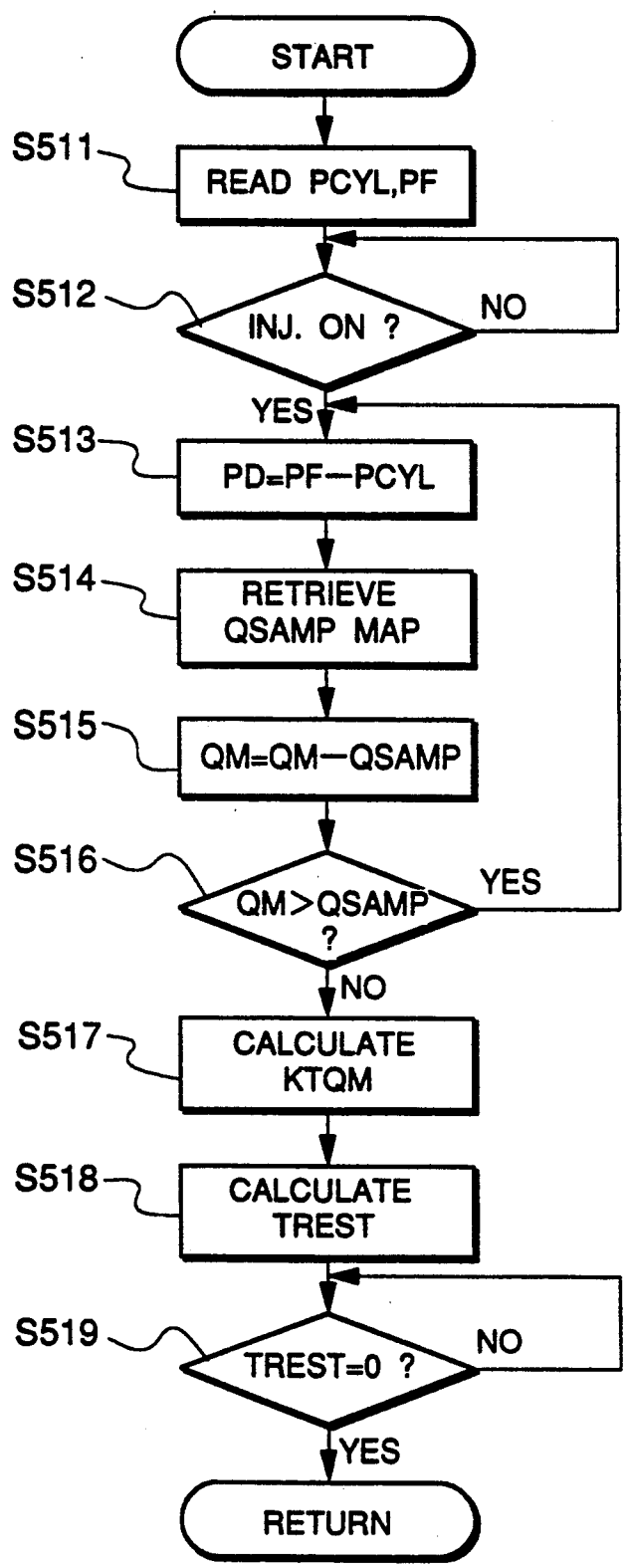
FIG. 17 is a flowchart of a routine for carrying out the sequential decrement of fuel injection amount.

Details of the sequential decrement processing will now be described with reference to FIG. 17 showing a flowchart of a program for executing the same processing.

First, values of the cylinder pressure PCYL and the fuel supply pressure PF sensed by the #1 PCYL sensor 3a and the PF sensor 27 are supplied to the #1 slave CPU 48a and stored into the #1 memory 50a, at a step S511. In this connection, as the cylinder pressure value PCYL, the true cylinder pressure value PCYL is stored into the #1 memory 50a, which has been obtained by the PCYL sensor calibration routine of FIG. 15.

Figure 18:
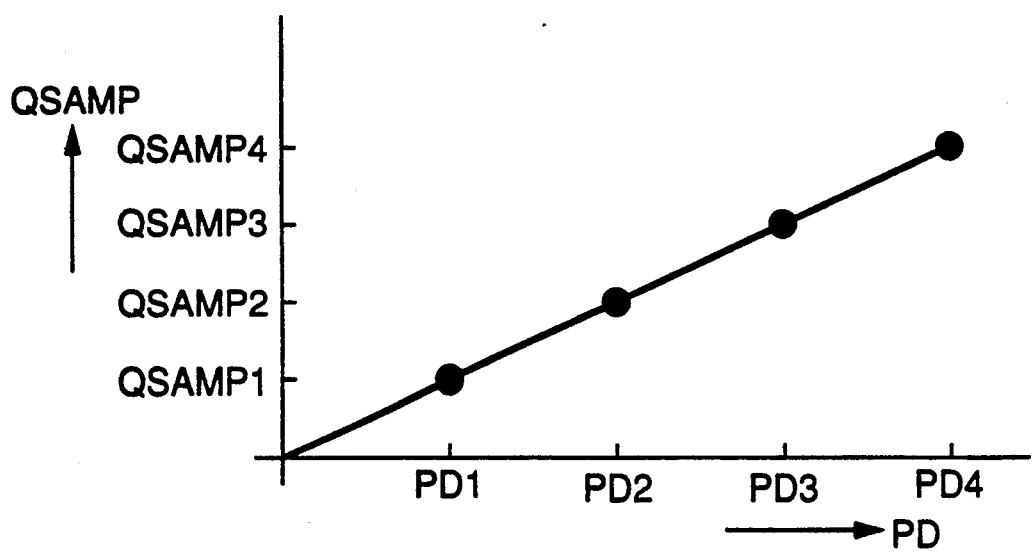
FIG. 18 shows a QSAMP map for determining a sampling fuel injection amount QSAMP.

Then, the program proceeds to a step S512, where it is determined whether or not the fuel injection value (#1 INJ) 2a has been energized. The fuel injection value (#1 INJ) 2a is energized when the stage number reaches an injection stage set by the injection stage calculation routine of FIG. 11, i.e. the calculated predetermined crank angle. If the value (#1 INJ) 2a is determined to have been energized, the actual injection fuel pressure PD is calculated from the difference between the fuel supply pressure PF and the cylinder pressure PCYL, at a step S513. Then, a QSAMP map is retrieved to determine the sampling fuel amount QSAMP at a step S514. An example of the QSAMP map is shown in FIG. 18, in which there are provided predetermined QSAMP values QSAMP1-QSAMP4 corresponding, respectively, to predetermined PD values PD1-PD4. By retrieving the QSAMP map, a QSAMP value is read from among the values QSAMP1-QSAMP4, which corresponds to the present or actual injection PD value, and the read QSAMP value is stored into the #1 memory 50a.

Then, at a step S515, the sampling fuel amount QSAMP obtained in the present loop is subtracted from the desired fuel injection amount QM calculated at the time of generation of the present CRK signal pulse (FIG. 6) to obtain a new value of the desired fuel injection amount QM (residual fuel injection amount), which is stored into the #1 memory 50a.

Next, at a step S516, it is determined whether or not the residual fuel injection amount is greater than the value of the sampling fuel amount QSAMP. If the answer is affirmative (YES), the program returns to the step S513 to again calculate a sampling fuel amount QSAMP corresponding to the actual injection fuel pressure PD and thereby calculate a new value of the desired fuel injection amount QM, followed by the program proceeding to the step S516.

Figure 19:
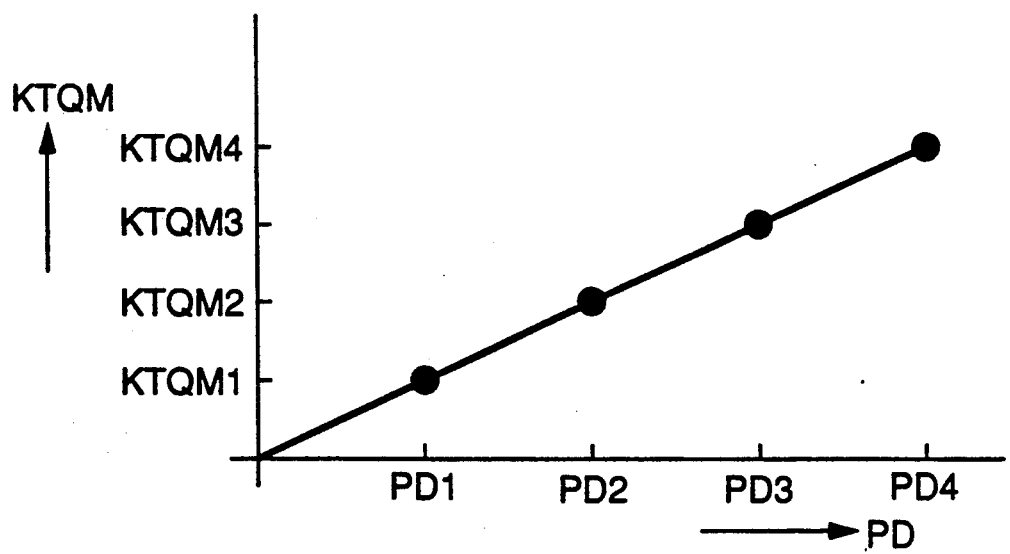
FIG. 19 shows a KTQM map for determining a time-convertion variable KTQM.

If the answer to the question of the step S516 is negative (NO), that is, when the residual fuel injection amount is smaller than the newly calculated sampling fuel amount, the program proceeds to a step S517 where a time-conversion coefficient KTQM is determined from a KTQM map stored in the ROM of the #1 memory 50a, and the determined KTQM value is stored into the RAM of the #1 memory 50a. The KTQM map as shown in FIG. 19, is provided with predetermined KTQM values KTQM1–KTQM4 corresponding, respectively, to predetermined PD values PD1–PD4. Then, the program proceeds to a step S518 where the residual fuel injection amount is converted to a residual injection time period TREST, by the use of the following equation (4), over which the residual fuel is to be injected:

$$TREST = KTQM \times QM \ldots \quad (4)$$

Finally, it is determined at a step S519, whether or not the desired fuel injection amount has been completely injected by monitoring the residual injection time period TREST. This determination is repeated until the residual injection time period becomes zero, and then the program is terminated.

In the above described manner, the fuel injection valve (#1 INJ) 2a is energized to start fuel injection at the injection stage ISTG determined by the aforedescribed injection stage calculation routine of FIG. 11, and then the sequential decrement processing is executed to determine the injection period in response to the actual injection fuel pressure PD until injection of the desired fuel injection amount QM is completed. At the same time, the #1 slave CPU 48a controls the ignition timing of the spark plug (#1 IG) 4a in response to an operating condition in which the engine is operating. The ignition timing of the spark plug (#1 IG) is set to a timing value causing spark ignition to take place after completion of the fuel injection or during fuel injection, in dependence upon the engine rotational speed NE and the desired fuel injection amount QM so as to optimize the fuel consumption and exhaust emission characteristics of the engine.

In the case where the spark ignition is effected immediately after completion of the fuel injection, i.e. fuel injection is started during the compression stroke and spark ignition is effected immediately before the TDC, the injected fuel which initially takes the form of a spray, is suitably mixed with air into a stratified form, and burned.

On the other hand, in the case where the spark ignition is started during fuel injection, i.e. fuel injection is started during the compression stroke and at the same time spark ignition is effected, the injected fuel, which initially takes the form of a spray, is transformed into a jet stream and burned. The fuel injection is completed on or before a point immediately after the TDC (e.g. 5° ATDC), and the combustion is completed almost at the same time as the completion of fuel injection.

In both the cases of spark ignition immediately after completion of fuel injection and spark ignition during fuel injection, fuel is injected within the crank angle range of 20° BTDC to 5° ATDC, so that a combustible premixed mixture is formed only around the spark plug 4a and burned in a stratified state (stratified combustion).

As described in detail above, according to the fuel injection control system of the invention, the desired fuel injection amount QM and the fuel injection initiation (injection stage ISTG) can be set in response to operating conditions of the engine so as to always achieve the best engine operation (driveability) and the minimum possible fuel consumption. Further, by virtue of the sequential decrement processing, the fuel injection amount can be controlled with accuracy even with a change in the cylinder pressure during fuel injection.

In addition, the ignition timing of the engine can be selected in response to operating conditions of the engine to effect spark ignition immediately after completion of the fuel injection or during fuel injection.

The invention is not limited to the above described embodiment, but may be altered without departing from the scope of the appended claims. Although in the above described embodiment the sequential decrement processing is executed in synchronism with the operation of a timer which generates false signal pulses, alternatively it may be executed in synchronism with generation of CRK signal pulses so that the sequential decrement of the fuel injection amount is carried out at variable time intervals dependent upon the engine rotational speed NE, whereby the sequential decrement frequency or repetition period can be varied in response to a change in the engine rotational speed NE.

Furthermore, although in the above described embodiment the processing circuit for sequential decrement processing (second processing circuit) includes four #1–#4 slave CPU's 48a–48d, alternatively a single large-capacity slave CPU which is able to effect high-speed processing may be employed for the cylinders to effect the sequential decrement processing of each cylinder.

What is claimed is:

1. A fuel injection control system for a spark ignition type internal combustion engine having at least one cylinder having a combustion chamber defined therein, at least one fuel injection valve arranged in said at least one cylinder, fuel being injected directly into said combustion chamber of said at least one cylinder through said at least one fuel injection valve, the fuel injection control system comprising:
crank angle-detecting means for detecting a crank angle of said engine whenever said engine rotates through a predetermined crank angle;
rotational speed-detecting means for detecting the rotational speed of said engine;
operating condition-detecting means for detecting operating conditions of said engine including a load condition of said engine;
fuel injection amount-calculating means for calculating a desired fuel injection amount based upon the rotational speed of said engine detected by said rotational speed-detecting means and said load condition of said engine detected by said operating condition-detecting means;
fuel pressure-determining means for determining desired fuel pressure based upon the rotational speed of said engine detected by said rotational speed detecting means;
fuel pressure-control means for controlling pressure of fuel supplied to said at least one fuel injection valve to the desired fuel pressure determined by said fuel pressure-determining means, and fuel supply-control means for supplying fuel to said at least one fuel injection valve under the desired fuel pressure determined by said fuel pressure-determining means, said fuel supply-control means causing supply of said fuel into said at least one cylinder through said at least one fuel injection valve when said crank angle detected by said crank angle-detecting means falls within a predetermined range in the vicinity of a top dead point of said at least one cylinder, corresponding to compression stroke thereof;

wherein said predetermined range of said crank angle is a range of 20° BTDC to 5° ATDC; and said fuel pressure-determining means determines said desired fuel pressure based upon the rotational speed of said engine and said load condition of said engine.

2. A fuel injection control system for an internal combustion engine having at least one cylinder having a combustion chamber defined therein, at least one fuel injection valve arranged in said at least one cylinder, fuel being injected directly into said combustion chamber of said at least one cylinder through said at least one fuel injection valve, the fuel injection control system comprising:

crank angle-detecting means for detecting a crank angle of said engine whenever said engine rotates through a predetermined crank angle;

rotational speed-detecting means for detecting the rotational speed of said engine;

operating condition-detecting means for detecting operating conditions of said engine including a load condition of said engine;

fuel injection amount-calculating means for calculating a desired fuel injection amount based upon the rotational speed of said engine detected by said rotational speed-detecting means and said load condition of said engine detected by said operating condition-detecting means;

fuel pressure-determining means for determining desired fuel pressure based upon the rotational speed of said engine detected by said rotational speed detecting means;

fuel pressure-control means for controlling pressure of fuel supplied to said at least one fuel injection valve to the desired fuel pressure determined by said fuel pressure-determining means;

fuel supply-control means for supplying fuel to said at least one fuel injection valve under the desired fuel pressure determined by said fuel pressure-determining means, said fuel supply-control means causing supply of said fuel into said at least one cylinder through said at least one fuel injection valve when said crank angle detected by said crank angle-detecting means falls within a predetermined range in the vicinity of a top dead point of said at least one cylinder, corresponding to compression stroke thereof;

cylinder pressure-detecting means provided, respectively, for said at least one cylinder, for detecting cylinder pressure within said at least one cylinder; and sequential decrement means, which, when said crank angle of said engine falls within said predetermined range, sequentially calculates an actual fuel injection amount based upon a difference between said pressure of fuel supplied to said at least one fuel injection valve and said cylinder pressure detected by said cylinder pressure-detecting means, and sequentially subtracts the calculated actual fuel injection amount from said desired fuel injection amount to thereby control timing of termination of fuel injection by said at least one fuel injection valve.

3. A fuel injection control system as claimed in claim 2, wherein said sequential decrement means effects said sequential calculation and subtraction of said actual fuel injection amount, in synchronism with false signal pulses generated at predetermined time intervals.

4. A fuel injection control system as claimed in claim 2, wherein said sequential decrement means effects said sequential calculation and subtraction of said actual fuel injection amount, in synchronism with crank signal pulses generated by said crank angle-detecting means at predetermined crank angles of said engine.

5. A fuel injection control system as claimed in claim 3, including a first processing circuit which is supplied with said false signal pulses, and at least one second processing circuit provided, respectively, for said at least one cylinder for executing said sequential calculation and substraction of said actual fuel injection amount by said sequential decrement means, said first and second processing circuits being electrically connected with each other, such that said second processing circuit executes said sequential calculation and subtraction of said actual fuel injection amount for each of said at least one cylinder in synchronism with generation of said false signal pulses.

6. A fuel injection control system as claimed in claim 4, including a first processing circuit which is supplied with said crank signal pulses, and at least one second processing circuit provided, respectively, for said at least one cylinder for executing said sequential calculation and substraction of said actual fuel injection amount by said sequential decrement means, said first and second processing circuits being electrically connected with each other, such that said second processing circuit can execute said sequential calculation and subtraction of said actual fuel injection amount for each of said at least one cylinder in synchronism with generation of said crank signal pulses.

7. A fuel injection control system as claimed in any of claims 1, or 2-6, including ignition timing-control means for controlling ignition timing of said engine in response to operating conditions of said engine detected by said operating condition-detecting means, said ignition timing control means setting said ignition timing to a value causing spark ignition to take place immediately after completion of fuel injection by said at least one fuel injection valve.

8. A fuel injection control system as claimed in any of claims 1, or 2-6, including ignition timing-control means for controlling ignition timing of said engine in response to operating conditions of said engine detected by said operating condition-detecting means, said ignition timing-control means setting said ignition timing to a value causing spark ignition to take place during fuel injection by said at least one fuel injection valve.

9. A fuel injection control system as claimed in any of claims 1, or 2-6, wherein said fuel is gasoline.

* * * * *